(12) United States Patent
Frei et al.

(10) Patent No.: US 6,418,967 B1
(45) Date of Patent: Jul. 16, 2002

(54) PRESSURE REGULATING VALVE

(75) Inventors: Walter Frei, Friedrichshafen; Georg Gierer, Kressbronn; Wolfgang Runge, Ravensburg; Hubert Remmlinger, Friedrichshafen; Karlheinz Mayr, Wasserburg; Wolfgang Schmid, Langenargen; Thilo Schmidt, Meckenbeuren, all of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/402,772

(22) PCT Filed: Apr. 11, 1998

(86) PCT No.: PCT/EP98/02128

§ 371 (c)(1),
(2), (4) Date: Oct. 7, 1999

(87) PCT Pub. No.: WO98/48332

PCT Pub. Date: Oct. 29, 1998

(30) Foreign Application Priority Data

Apr. 18, 1997 (DE) .......................... 197 16 135
Oct. 10, 1997 (DE) .......................... 197 44 696

(51) Int. Cl.[7] .............................. F15B 13/044
(52) U.S. Cl. .................. 137/625.65; 137/596.17; 251/129.14
(58) Field of Search ............... 137/596.17, 625.65; 251/129.14

(56) References Cited

U.S. PATENT DOCUMENTS

| | | | |
|---|---|---|---|
| 3,916,932 A | 11/1975 | Thorson | ............ 137/101 |
| 4,338,966 A * | 7/1982 | Smith | ........... 137/596.17 |
| 4,998,559 A * | 3/1991 | McAuliffe | ........... 137/596.17 |
| 5,076,323 A | 12/1991 | Schudt | |
| 5,135,027 A | 8/1992 | Miki et al. | |
| 5,606,992 A * | 3/1997 | Erickson et al. | ....... 137/596.17 |
| 5,641,211 A | 6/1997 | Feigel et al. | |
| 5,651,391 A * | 7/1997 | Connolly et al. | ... 137/596.17 X |
| 5,915,416 A * | 6/1999 | Okazaki et al. | ........ 137/596.17 |

FOREIGN PATENT DOCUMENTS

| | | |
|---|---|---|
| DE | 29 54 322 C2 | 4/1981 |
| DE | 31 06 086 C2 | 9/1982 |
| DE | 34 12 351 A1 | 10/1985 |
| DE | 34 17 383 A1 | 11/1985 |
| DE | 44 26 152 A1 | 3/1996 |
| EP | 0 149 239 A2 | 7/1985 |
| EP | 0 284 769 A1 | 10/1988 |
| EP | 0 334 030 A2 | 9/1989 |
| EP | 0 645 291 A1 | 3/1995 |
| WO | WO 92/09836 | 6/1992 |
| WO | WO 99/08169 | 2/1999 |

* cited by examiner

*Primary Examiner*—Gerald A. Michalsky
(74) *Attorney, Agent, or Firm*—Davis & Bujold, P.L.L.C.

(57) ABSTRACT

Pressure regulating valve comprising a connection for a pressure line (P), a connection for a working line (A), a connection for an outlet line (T) communicating with the ambient pressure and at least two diaphragm stages with defined or definable drag, the two diaphragm stages being connected to each other in a variable manner and subject to mechanical or hydraulic action according to the principle of the hydraulic half bridge. The two variable diaphragm stages are provided as the inlet and outlet diaphragms of a pressure regulating chamber (7) and each has a sealing element, said sealing element (5) of the inlet diaphragm (3) is designed as ball, or calotte, ortruncated cone, or cylinder and/or the sealing element of the outlet diaphragm is designed as ball, or calotte, or truncated cone, or cylinder.

19 Claims, 23 Drawing Sheets

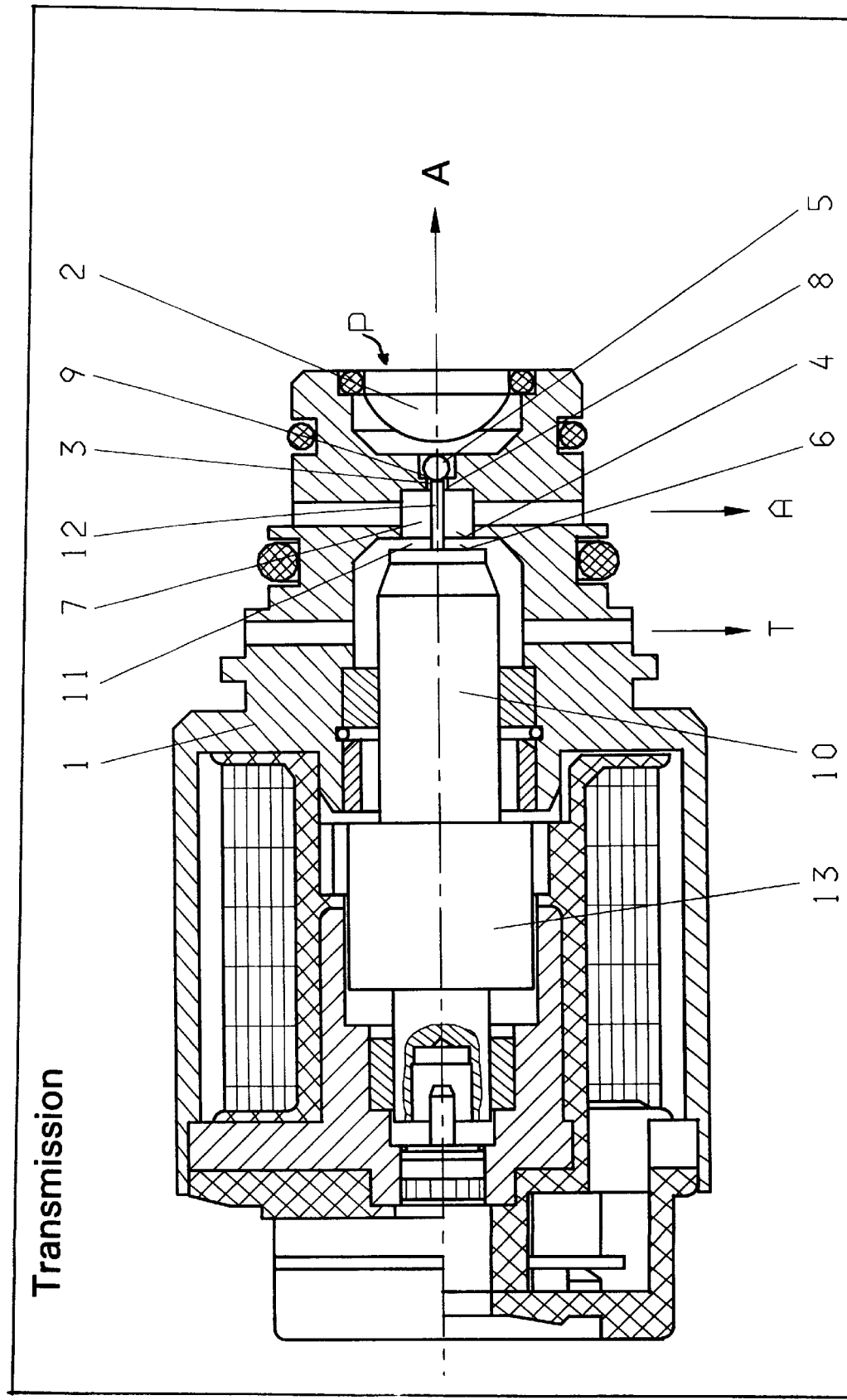

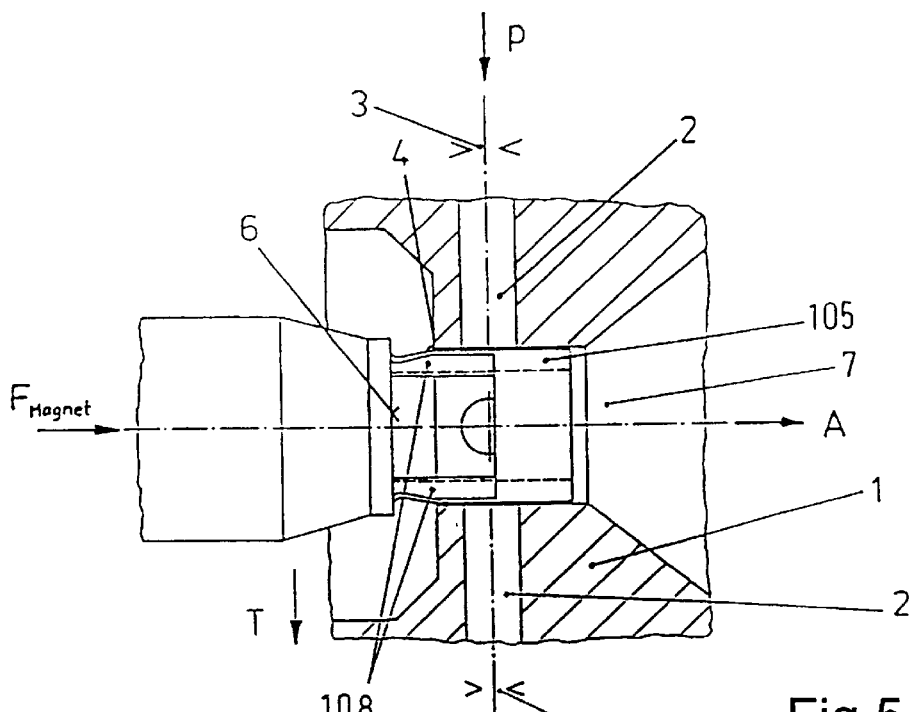
Fig.5
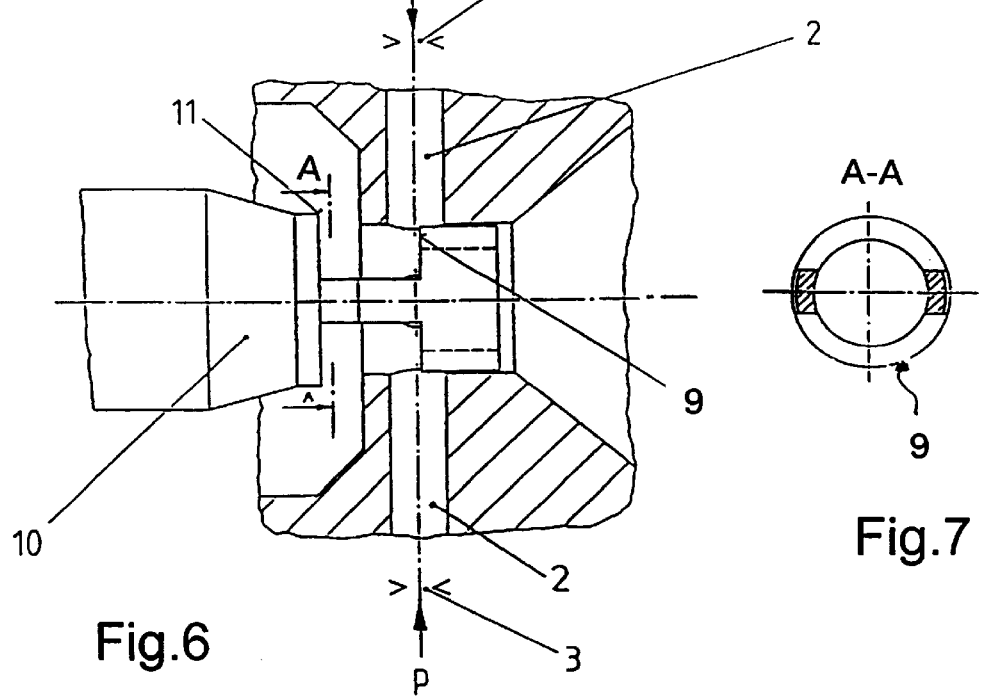
Fig.6
Fig.7

PRESSURE REGULATING VALVE

The invention relates to a proportional pressure regulating valve of the 3/2 directional type consisting of a valve housing which has a regulating pressure chamber and with a pressure medium sump line and with at least two diaphragm stages with defined or definable drag of which two diaphragm stages are connected with each other according to the principle of the hydraulic half bridge.

BACKGROUND OF THE INVENTION

DE-C 44 26 152 describes an electromagnetic pressure regulating valve, especially for regulating the shift pressure of automatic motor vehicle transmission, which has a valve housing and control shift valve actuatable by a magnetic armature and connected therewith, which controls connections from a pressure medium intake to a consumer connection or a return flow or tank. The control shift valve is situated in a rear and in a front bearing point in the valve housing and is prestressed via an adjusting spring. With this pressure regulating valve there are throughout the service life no changes of the valve characteristic resulting from problems caused by dirty oil, since a pressure drop relative to a through flow, especially of the dirt-sensitive armature chamber, is prevented. In the inlet area on the bearing gap and on the outlet opening of the current path from the ventilation hole, the same velocity energy potential prevails.

U.S. Pat. No. 3,915,932 has further disclosed a valve which has two diaphragm stages connected according to the principle of the hydraulic half bridge and is used as volume governor for dividing a pressure medium flow in a main and an accessory flow.

The valves, already known, often have the disadvantage that they either reach a minimum working pressure near zero bar or that the leakage flow of the pressure medium is minimized to nearly zero when the working pressure is minimal.

SUMMARY OF THE INVENTION

The problem on which this invention is based is to provide a proportional pressure regulating valve, especially for the regulation of shift pressure in automatic motor vehicle transmissions, in which the minimal working pressure is almost zero and the leakage flow of the pressure medium in the end position of the control shift valve is minimized to almost zero with minimal working pressure and which makes possible an adaptation of the flow properties of the valve to the conditions existing during utilization.

The aforementioned problem is solved by the present invention.

The pressure regulating valve is designed as connected throttle or diaphragm system (hereinafter the expression diaphragm will be used to mean throttle or diaphragm). The connected diaphragm system consists of two mechanically of hydraulically connected regulating diaphragms. The regulating diaphragms are according to the principle of the hydraulic half bridge. Before the two regulating diaphragms can be front-mounted a fixed diaphragm. This connected diaphragm system has three connections: a pressure medium supply line (connection P), a working pressure line to the consumer (connection A) and a pressure medium sump line to the pressure medium sump (connection T). The connection P is situated on the inlet side before the first regulating diaphragm or fixed diaphragm, the connection A is situated, e.g. between the two regulating diaphragms and the connection T is located on the outlet side behind the second regulating diaphragm. Each one of the diaphragms constitutes a drag. The two regulating diaphragms are at the same time adjustable drags. The operating principle of said pressure regulated valve works similarly to the one of an electric voltage divider with two connected adjustable slide resistances or with a front-mounted fixed resistance and two connected adjustable slide resistances. Each one of the diaphragms produces a certain pressure drop. On the input side of the first regulating diaphragm or of the fixed diaphragm supply pressure prevails, while on the output side, after the second regulating diaphragm, ambient pressure prevails. The pressure between the two regulating diaphragms is adjustable, according to the opening of the diaphragms, between ambient pressure and supply pressure. At the same time, the two regulating diaphragms form inlet and outlet openings of a pressure regulating chamber and each has a sealing element for opening and closing the diaphragms. According to the invention, the sealing element of the inlet diaphragm is designed as ball, or calotte, or truncated cone, or cylinder and/or of the sealing element of the outlet diaphragm as ball, calotte, or truncated cone, or cylinder, i.e. on one hand, a sealing element in the inlet or outlet is designed as ball, calotte, truncated cone, or cylinder. On the other hand, both sealing elements can be designed as ball, calofte, or truncated cone, or cylinder, it being possible for both sealing elements to have either the same or different shape. The inflowing and outflowing characteristic of both regulating diaphragms can thus be advantageously adjusted as best as possible to the existing condition of use of the valve. The type, e.g. of each separate diaphragm as seat or shift valve and thus the shape of the sealing surface, the same as the pressure intensification through each diaphragm, is at the same time individually adjustable.

Both regulating diaphragms are connected by a control shift valve. The diaphragms, especially the sealing elements, do not have to be rigidly or integrally connected with the control shift valve, but can also be separately designed and loosely abut on the control shift valve, the contact force being produced in the pressure medium flow by the drag of a loose diaphragm. By moving the control shift valve in one direction, the cross section of the inlet diaphragm is enlarged and that of the outlet diaphragm is simultaneously reduced. When the control shift valve moves in opposite direction, the cross sections change in inverse manner. This corresponds to the operation principle of a hydraulic half bridge. Depending on the configuration of the connection, positions of the control shift valve can result in which one diaphragm is already fully open while the other still is not fully closed (negative overlapping of the leading edges). In a possible condition of operation, the inlet diaphragm is already completely open and the outlet diaphragm still not fully closed. In this condition of operation, the system of the two connected regulating diaphragms becomes reduced to a system having fixed inlet diaphragm and regulatable outlet diaphragm.

In a system of two connected regulating diaphragms with front-mounted fixed diaphragm, if the drag of the inlet regulating diaphragm is clearly less than that of the front-mounted fixed diaphragm, then the inlet regulating diaphragm for the self-adjusting regulating pressure is no longer important. The system comprised of one front-mounted fixed diaphragm with two consecutive connected regulating diaphragms becomes reduced in this operation condition to a system with fixed inlet diaphragm and regulatable outlet diaphragm. According to the present state of the art, by means of one such reduced system, e.g. mechanical shift pressure for transmission control are regulated. This means that in this operation condition, it is possible to apply the experience acquired over the years with conventional seat valves.

Compared to the system having one regulating diaphragm and one fixed diaphragm, the system having two connected regulating diaphragms has the advantage that when the outlet diaphragm is fully open the through flow is not maximal as in the system of fixed and regulating diaphragms but is minimized to zero by the sealing element of the inlet regulating diaphragm. The same also applies to the case of additionally front-mounted fixed diaphragm. The operation condition "fully open outlet diaphragm" corresponds in both systems and in the reduced system with fixed inlet diaphragm and regulatable outlet diaphragm to the minimal regulating pressure. In the system having two connected regulating diaphragms—with or without front-mounted fixed diaphragm—said lowest, adjustable regulating pressure is minimized by blocking the inlet to ambient pressure across the outlet, while in the system comprised of fixed and regulating diaphragms a final residual pressure remains due to the hydrodynamic effects. The medium through flow is higher in the system comprised of fixed and regulating diaphragms. This results in higher power losses compared to the system having two connected regulating diaphragms. One other advantage is that as a consequence of the low maximum through flow, the pump for preparing the supply pressure can be given smaller dimensions.

According to a first design of the invention, the pressure regulating valve is constructed as a system of two variable diaphragm stages mechanically or hydraulically connected. This advantageously stands out by a simple, economical construction.

In an advantageous development of the invention, the valve is constructed as a system of three diaphragm stages having one first pressure-side, fixed diaphragm stage and two connected variable diaphragm stages whereby more possibilities exist for adjustment of the flow properties than in the above mentioned design having only two variable diaphragm stages.

This pressure regulating valve, according to the invention, is advantageously used for regulating the hydraulic pressure for actuating transmission shifts.

In an advantageous development of the invention, two variable diaphragm stages are lodged in one part. The inlet diaphragm in the regulating pressure chamber is shown in the shape of a hole through a valve housing that forms an intake which can be covered with a sealing element. The outlet diaphragm is designed in the form of a seat valve where an axial wall surface of the valve housing covers a sealing or front surface of a sealing element, particularly of an armature rod. A stud-shaped control shift valve, which joins up in axial direction with the armature rod, can push out from its seat the sealing element of the inlet diaphragm. The control shift valve connects the two diaphragms, on one hand, by establishing the cross section of the inlet diaphragm by covering the intake surface with the sealing element and, on the other, by determining the surface of the outlet diaphragm by the spacing between the axial wall surface and the front face. When the outlet is closed, the front sealing surface of the armature rod abuts on the wall surface of the valve housing. The stud-shaped control shift valve at the same time pushes the sealing element of the inlet diaphragm out of its seat in the intake. The intake in the pressure regulating chamber is completely released in this position. Due to the axial movement of the control shift valve, the outlet diaphragm opens and causes a pressure drop in the pressure regulating chamber and thus in the working line. When the outlet cross section is further opened, the stud-shaped control shift valve is drawn further back. The sealing element of the inlet diaphragm thus approaches the intake and the effective intake cross section diminishes. When the outlet is almost completely open the intake is fully blocked. The pressure regulating chamber is then completely separated from the intake and an ambient pressure appears.

The sealing element does not have to be integrally connected with the control shift valve or the armature rod, i.e. the parts designed with two or more pieces. The flow or the pressure of the pressure medium allows it to abut on the control shift valve and follows up the control shift valve when it retracts. For lodging the sealing element, especially when it is not integrally connected with the control shift valve, a cage is advantageously provided which can also be used for targeted setting of the inflow characteristic.

Since the intake opening forms one part of the front surface of a cylindrical valve chamber, the force acting upon said surface has an axial component so that a hydrostatic cohesion has to be overcome to open said intake by axial displacement of the control shift valve and thus removal of the sealing element from its seat in the intake opening under different pressure in the pressure regulating chamber and intake. The cohesion results from the difference of the medium pressure in the intake and the pressure regulating chamber multiplied by the surface of the intake opening. Therefore, the intake opening is not given too large dimension in order to obtain an acceptable valve characteristic. When the valve is open the axial force upon the armature results as sum of the product from a medium value of the pressure in the pressure regulating chamber, which approximately corresponds to the working pressure in the consumer, and the free armature surface (full armature surface minus cross sectional surface of the control shift valve) and by the force produced by the back pressure on the sealing element.

The sealing element is advantageously designed in one piece with the control shift valve.

In a technical variant both mechanically connected diaphragms are regulated by a shift valve which projects through both diaphragm openings and over its axial extension has a double-sided cone with a tapering in its center. On its axially outer ends the cross section of the control shift valve increases in a manner such that it can completely seal the diaphragm openings. By movement in one or other axial direction it thus seals the inlet or outlet diaphragm.

In an advantageous development of this technical variant of the invention, a fixed diaphragm is mounted in front of the two mechanically connected diaphragms.

The pressure regulating valve is preferably magnetically actuated. The displacement force of said pressure regulating valve is at the same time the force which an electromagnet exerts on the induced, magnetic torque of a soft-iron armature. The soft-iron armature is advantageously pressed on the armature rod.

As technical variant, the pressure regulating valve can also be actuated piezo-electrically or pneumatically.

In another advantageous development of the invention, three diaphragms are lodged in a discrete part. The three diaphragms are composed of one fixed diaphragm on the intake side and two connected regulating diaphragms. The fixed diaphragm on the intake side can here be designed as front-mounted diaphragm but also as throttle in the shape of one or more holes. The connected regulating diaphragms form the inlet and outlet of a regulating pressure chamber. The regulated inlet diaphragm is shown by at least one radial intake hole through a valve housing interacting with a control shift valve which extends partially into the cylindrical, hollow pressure regulating chamber. The control shift valve is axially movable over a certain length within the pressure regulating chamber. The control shift valve consists of one sleeve which can accurately fitting slide in the cylindrical pressure regulating chamber and at least one preferably web-shaped connecting piece to a front surface of an armature rod. The front surface is larger than the axial cross sectional surface of the pressure regulating chamber. The cross sectional surface of the inlet hole(s) can be sealed to any extent desired by the surface of the sleeve. The axial outer wall of the sleeve constitutes at the same time the leading edge of the inlet diaphragm wherein the latter acts as control shift valve. The outlet diaphragm is formed by a seat valve in which an axial wall surface of the valve housing covers the front surface of the armature rod. The web-shaped connecting piece constitutes the mechanical connection between the leading edges. When the outlet is closed, the front surface of the armature rod abuts on the wall surface of the valve housing. The sleeve projects here into the cylindrical pressure regulating chamber far enough so that the radial intake hole(s) be located between sleeve and front surface of the armature rod. The intake hole(s) is (are) completely released in this position. By axial movement of the control shift valve, the outlet diaphragm opens and causes a pressure drop in the pressure regulating chamber and thus in the working line. When the outlet cross section is further opened, the inlet leading edge begins to strike over the cross section of the radial intake hole(s). When the outlet is almost completely open, the intake hole(s) becomes (become) completely blocked. The pressure regulating chamber is then completely separated from the intake and ambient pressure appears there. In this development of the invention the armature rod and the control shift valve comprised of the web-shaped connecting piece and the sleeve are advantageously designed in one piece. The production as rotary part recommends itself wherein the end forming the control shift valve is turned off as hollow cylinder and subsequently a milling work cycle across the axis of rotation leaves residually as webs two axially extending hollow cylinder segments which constitute the connecting piece between armature rod and sleeve. Since the inlet opening(s) is (are) situated on the surface of one cylindrical valve chamber, the force acting upon said surface has no axial component so that for opening said inlet (said inlets) by axial displacement of the sleeve under different pressure in the pressure regulating chamber and intake, no hydrostatic cohesions have to be overcome. The axial force upon the armature results as product of a medium value of the pressure in the pressure regulating chamber, which nearly corresponds to the working pressure in the consumer, and the full armature surface (free armature surface plus cross sectional surface of the connecting piece).

The sleeve connected via the web-shaped connecting piece with the armature rod, by adequate matching of material, can be directly lodged in the valve housing as hydraulic-side bearing.

The armature rod and the control shift valve are preferably designed in one piece.

The inlet regulating diaphragm preferably has in the valve housing several radial intake holes which are connected via an annular duct with the front-mounted, fixed diaphragm.

In an advantageous embodiment of the invention, one sealing surface is provided on one front side of the armature rod, said sealing surface interacting with a corresponding sealing surface on the valve housing and thus making possible a flat-seat sealing with the best sealing properties.

In one other design, it is now proposed frusto conically to design the area between the front surface of the armature rod designed as sealing surface and the control shift valve. Thus are advantageously combined by the truncated cone the good sealing properties of a flat seat with a favorable, namely, as low as possible, design of the pressure booster, the base of the truncated cone being disposed on the front surface of the armature rod.

BRIEF DESCRIPTION OF THE DRAWING(S)

The invention is explained in detail herebelow with the aid of the drawings in which advantageous embodiments are shown. The drawings show:

FIG. 3 is a section through a pressure regulating valve in a first development of the invention;

Figure 1:
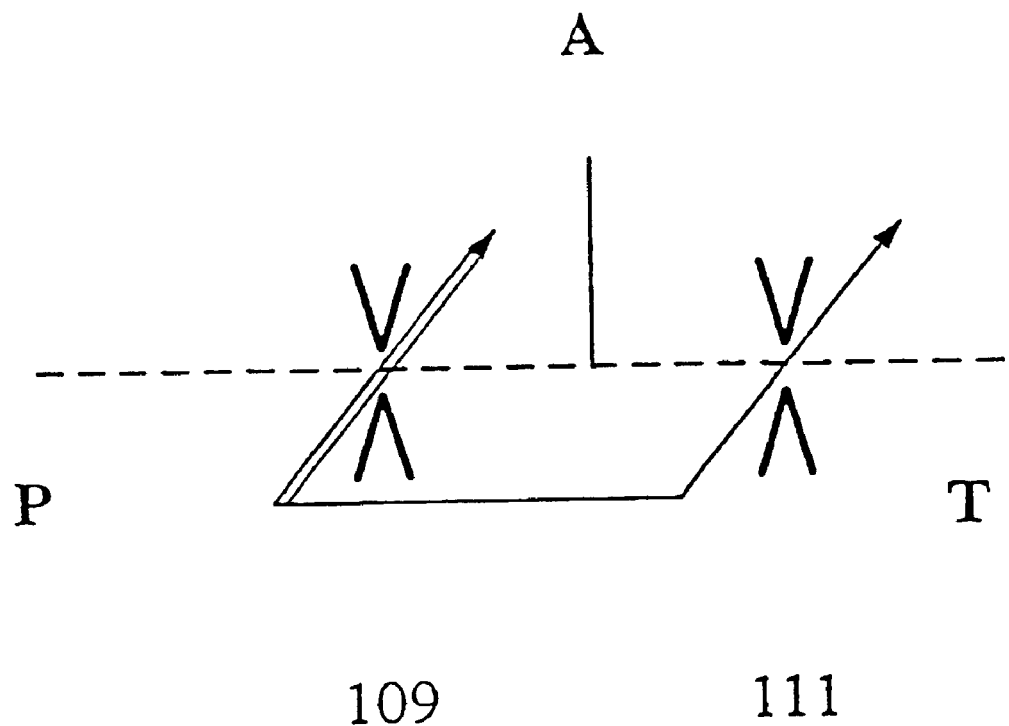
FIG. 1 is a principle gearshift diagram of a pressure regulating valve with two connected regulating diaphragms.
Figure 2:
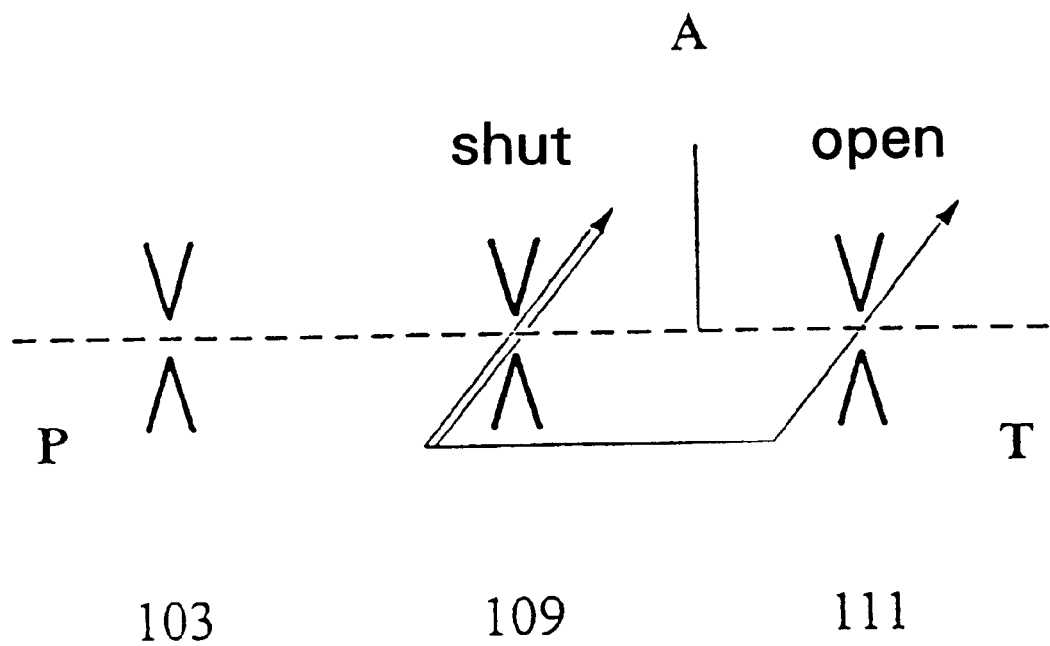
FIG. 2 is a principle gearshift diagram of a pressure regulating valve with two connected regulating diaphragms and one front-mounted, fixed diaphragm.
Figure 4A:
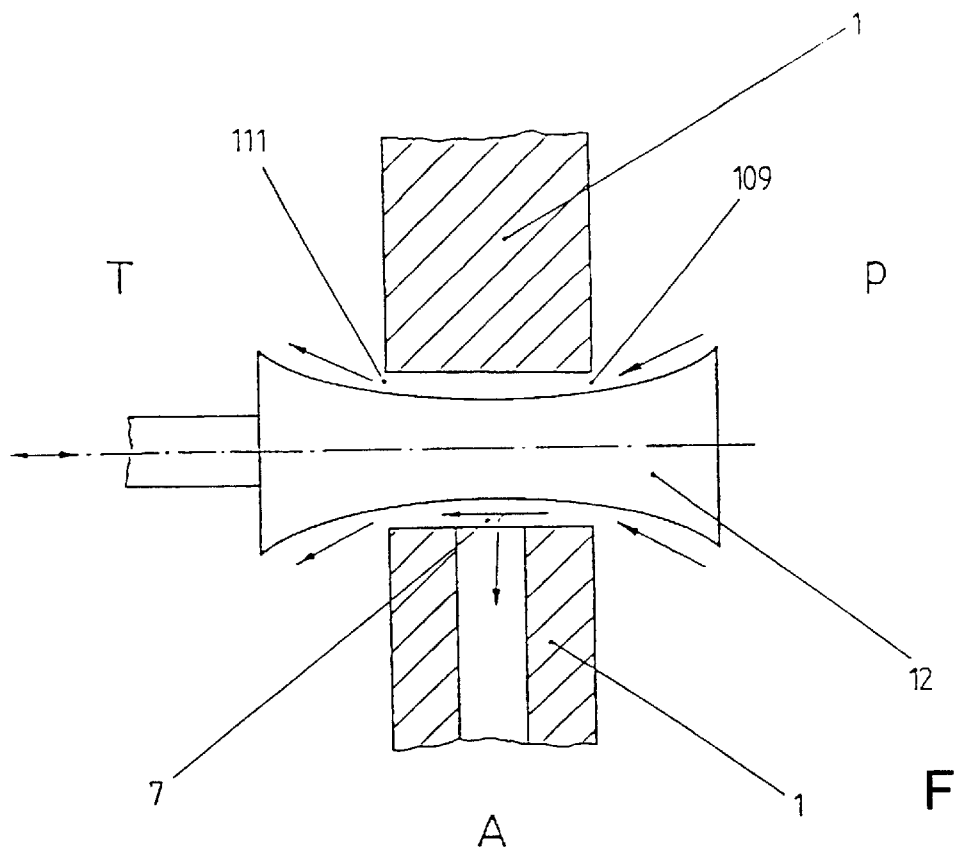
Figure 4B:
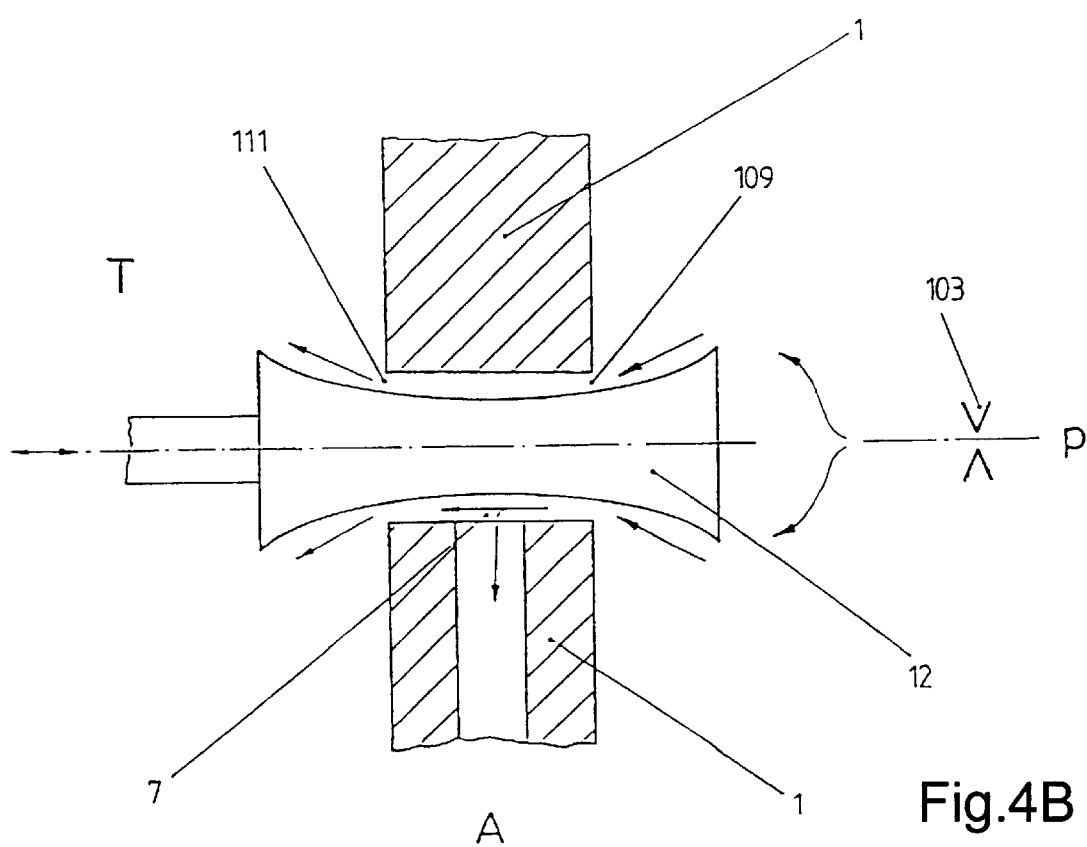
Figure 8:
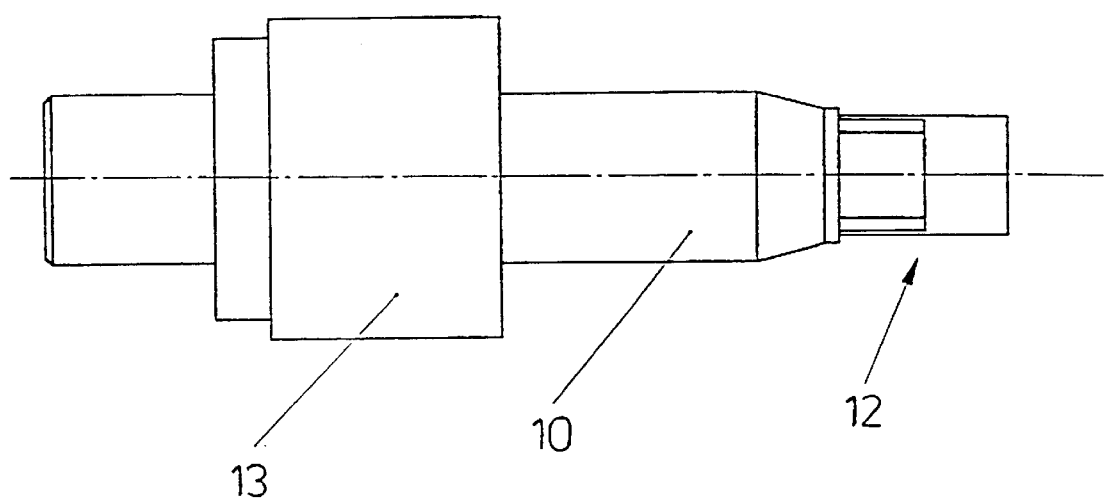
Figure 9:
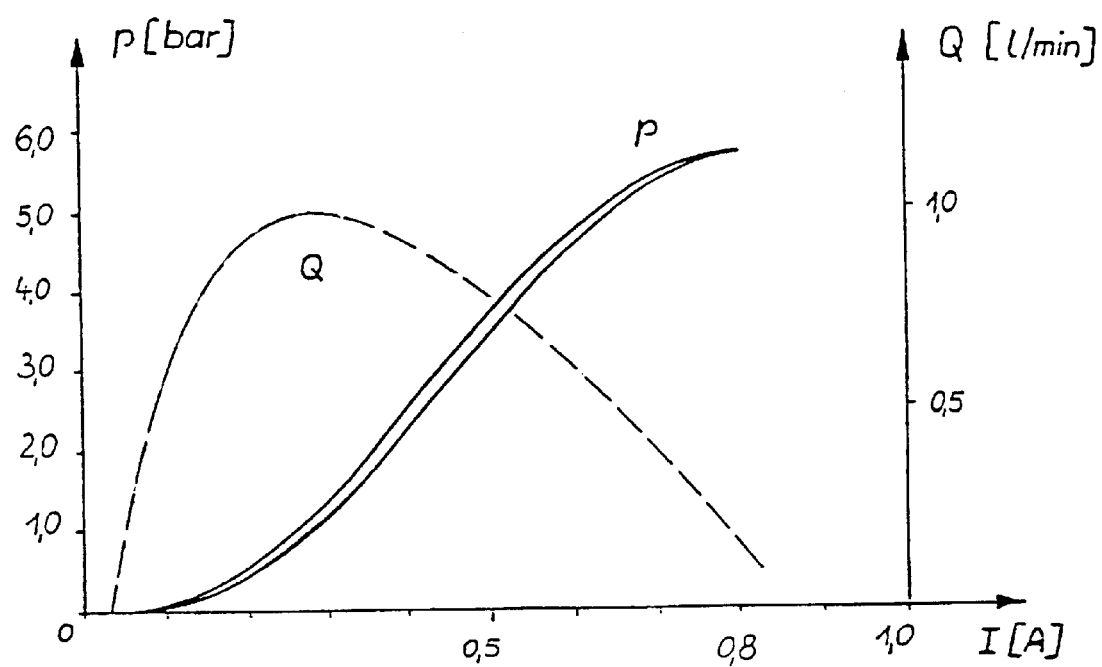
Figure 10A:
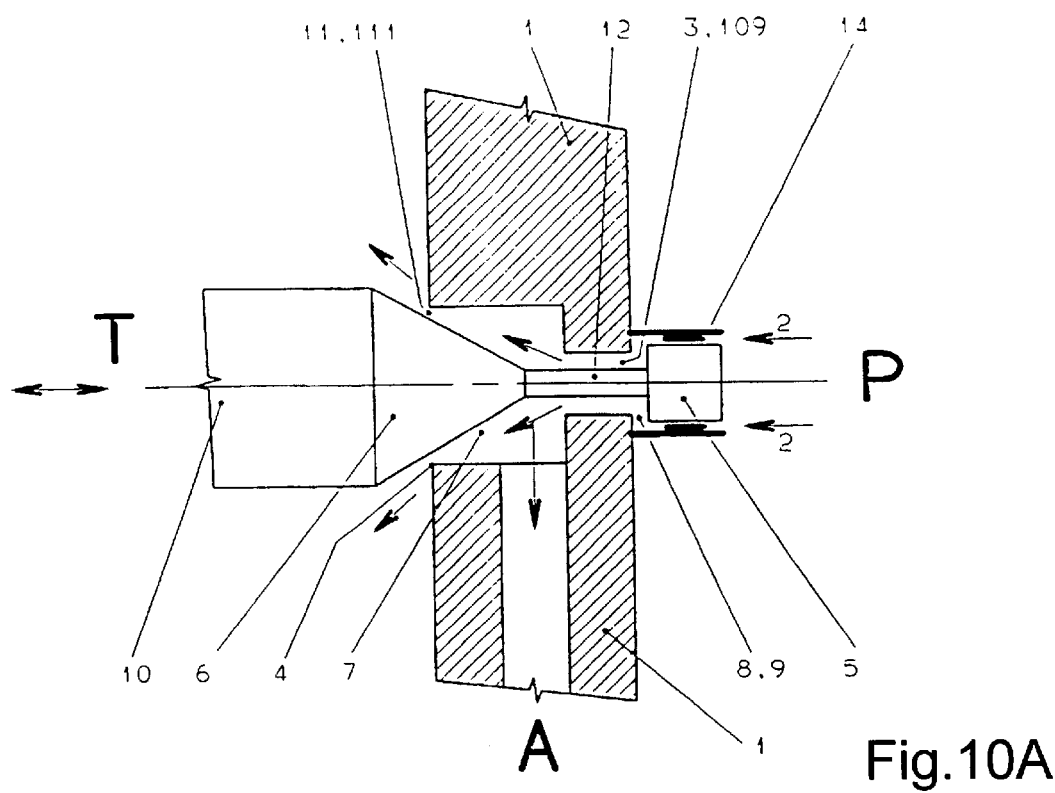
Figure 10B:
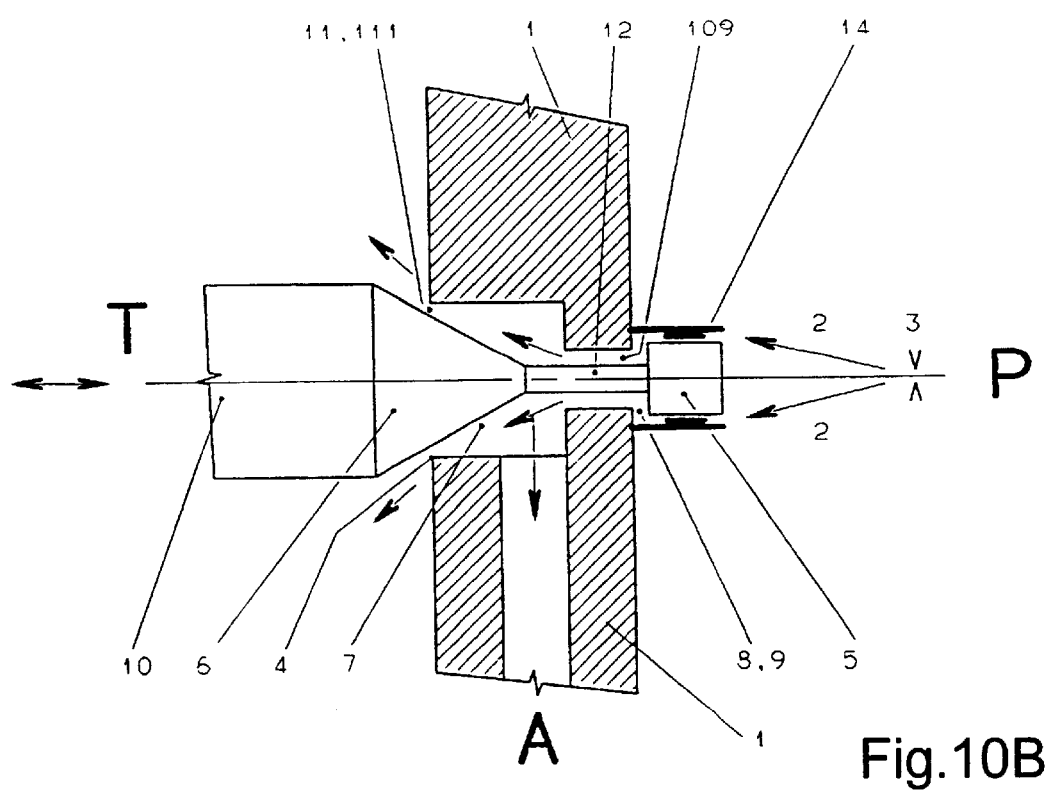
Figure 11A:
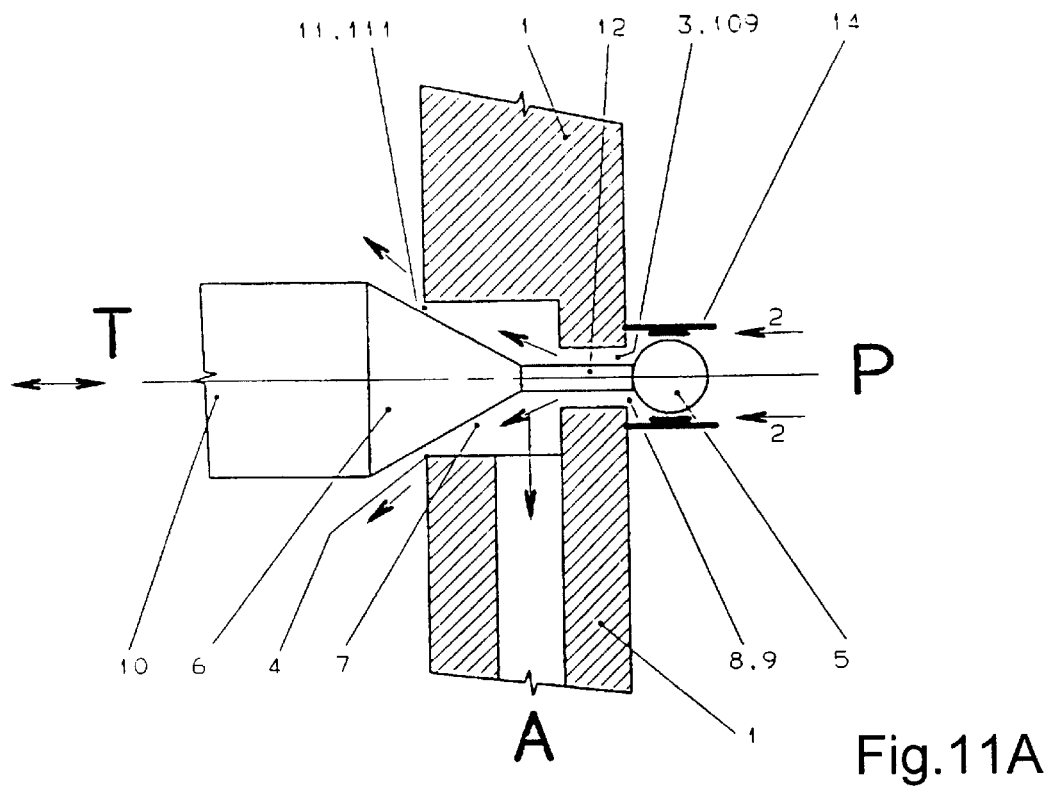
Figure 11B:
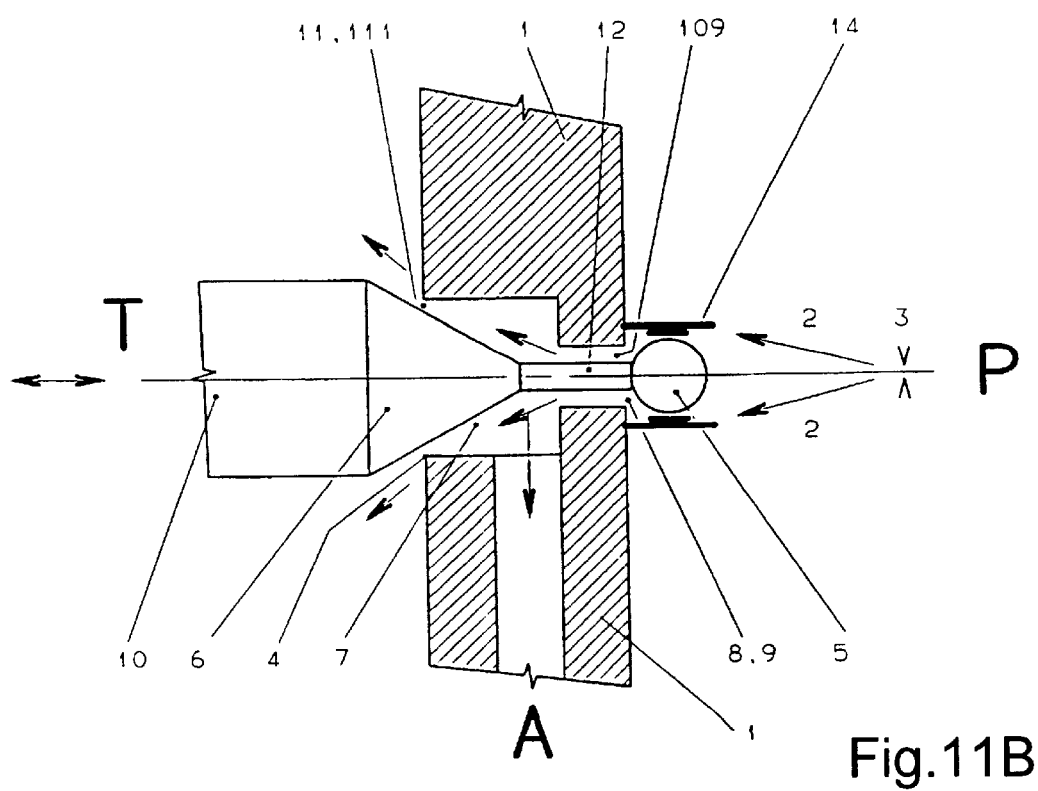
Figure 12A:
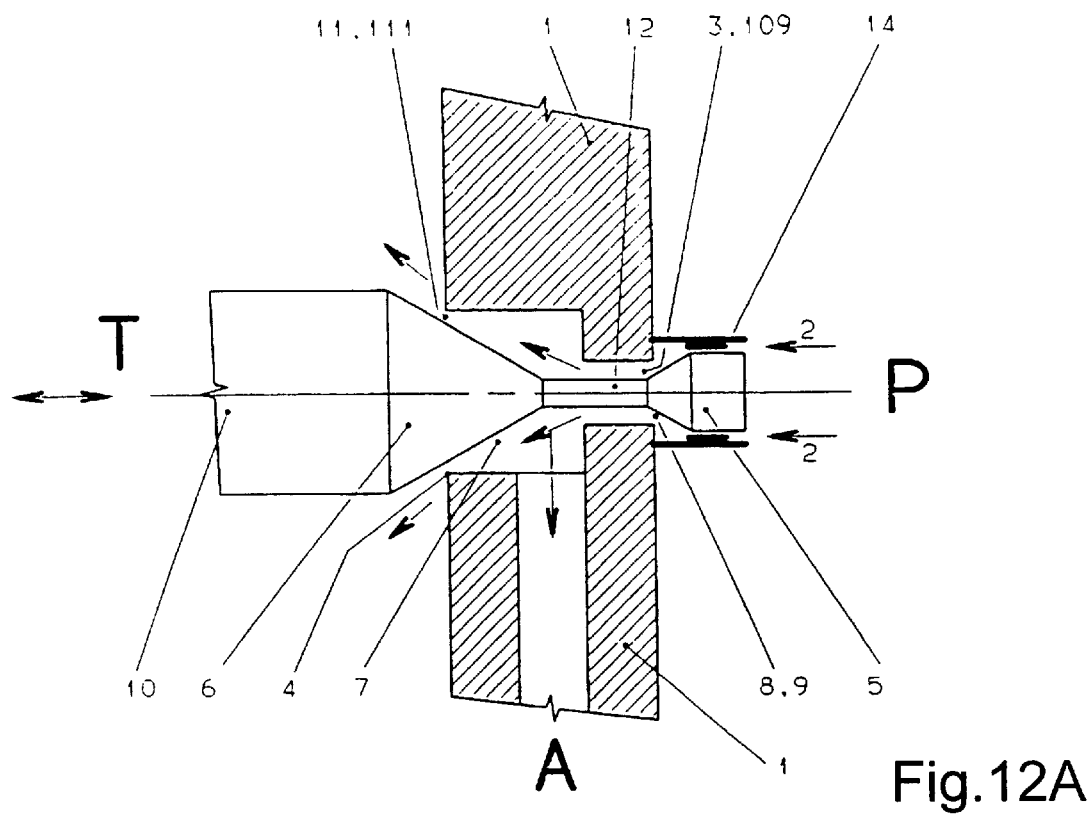
Figure 12B:
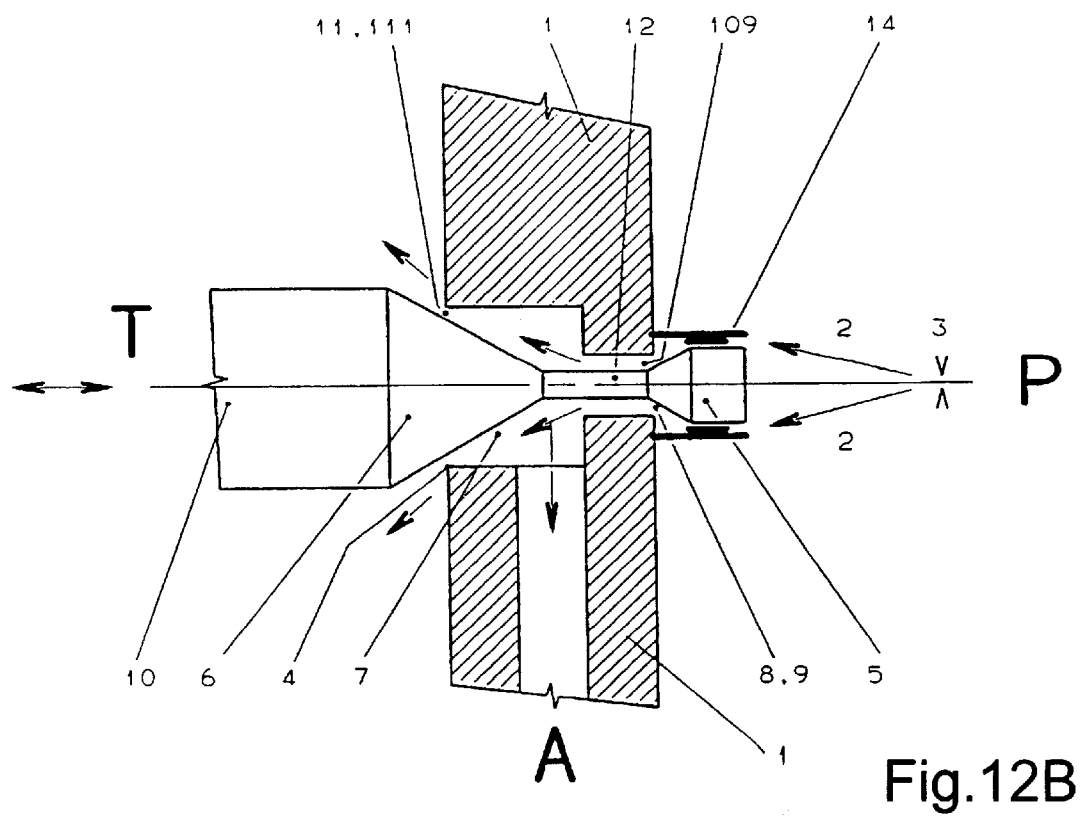

FIGS. 4A and B are a technical variant of this pressure regulating valve according to the invention with a control shift valve which penetrates through both diaphragm openings and has at its center, over its axial extension, a conical tapering (the lower illustration shows a design with an additional front-mounted, fixed diaphragm);

FIGS. 5 and 6 are two sections offset by 90 degrees relative to each other through the essential part of a second development of the pressure regulating valve according to the invention;

FIG. 7 is a section along the line A—A of FIG. 6;

FIG. 8 is a connecting piece consisting of an armature, an armature rod and a control shift valve in the last development of the invention;

FIG. 9 is a pressure flow leakage diagram; and

FIGS. 10A to 25B are diagrammatical illustrations of pressure regulating valves having different combinations of the sealing elements wherein the lower illustration essentially corresponds to the upper, but shows in addition a front-mounted, fixed diaphragm.

DESCRIPTION OF THE PREFERRED EMBODIMENTS

As shown in FIG. 3, the pressure regulating valve in the first development of the invention acts as 3/2 directional valve with blocking of the pressure medium in the pressure medium supply line 2 with large working strokes. Here the operation corresponds to that of a hydraulic half bridge. The pressure medium supply line 2 preferably discharges via an axially situated intake opening in the pressure regulating chamber 7. The pressure regulating valve, the housing of which is designated with 1, conventionally has an electromagnet which moves an armature 13 in direction of the axis A against the action of a spring. The armature 13 positions the control shift valve 12 via an armature rod 10. The control shift valve 12, which joins up with the front surface 6 of the armature rod 10 designed as sealing surface, is designed in the shape of a stud which can push out from its seat in the intake hole 8 a sealing element 5 designed as ball. Armature rod 10, control shift valve 12 and sealing element 5 can be made of one, two, three or more pieces. In an end position of the pressure regulating valve, the sealing element 5 seals completely the hole of the intake opening 8 of the pressure medium supply line 2 in the regulating pressure chamber 7. In the other end position, the front surface 6, acting as leading edge 11 of the outlet abuts, on the wall surface 4 of the valve housing 1. The sealing element is simultaneously pushed out from its seat by the stud-shaped control shift valve 12 and the intake opening 8 of the pressure medium supply line 2 is released so that the pressure medium completely energizes with pressure the pressure regulating chamber 7 and thus the consumer. In both end positions of the armature rod 10 or of the control shift valve 12, the pressure medium flow is interrupted by locking, on one hand, the intake to the pressure regulating chamber 7 and, on the other, the exit to the pressure medium sump. Therebetween, while pressure p of the pressure medium flowing into the regulating pressure chamber 7 increases, the volume flow Q reaches a maximum, as results from FIG. 9.

The complete locking of the intake opening 8 of the pressure medium supply line 2 by the sealing element 5 causes, therefore, the pressure medium leakage to minimize, wherein on account of the axial pressure medium supply line, the pressure medium exerts on the sealing element 5 and thus on the control shift valve 12 and the armature rod 10 a slight axial pressure conditioned by back up pressure. However, the displacement forces to move the control shift valve 12, i.e. to shift the sealing element 5 out of its seat in the intake opening, are slight. The internal pressure feedback from the pressure regulating chamber 7 to the sealing surface 6 of the armature rod 10 acting as armature active surface makes possible an uncomplicated regulation operation. The armature chamber is pressureless like in the conventional seat valve constructed in series described in DE-C 44 26 152. The problem arising in the conventional 2/2 seat valves that said pressureless armature chamber is flushed due to the entrance of the leakage pressure medium and, at the same time, iron dust particles deposit as dirt is reduced in the pressure regulating valve, according to the invention, by blocking of the intake in the pressure regulating chamber in the end position "minimal working pressure", for: in conventional 2/2 direction pressure regulating seat valves, the through flow is maximal in the position "minimal pressure" and thus also the influx current and the entrance of the dirt particles. There is finally obtained a large utilizable pressure area, since no residual pressure conditioned by the back up pressure appears (FIG. 9). Chips of up to 200 μm diameter of the size classification, such as appear as green assembly dirt, can be clamped on the leading edge 9 formed by interaction of the sealing element 5 and the intake hole. In this working stroke the intake cannot be fully blocked. A small through flow to the pressure medium sump remains. A jamming of the sealing element 5 by this entrance of chips is not possible due to the slight displacement forces in this position of the control shift valve 12, or in case of a loose sealing element 5, as consequence of the slight back up forces of the pressure medium on the sealing element 5. The slight clamping forces due to the slight displacement forces do not lead to damage of the leading edge by pressing of the chip. If the intake hole again is opened during the next working stroke, the chip is again released.

As partly and diagrammatically shown in FIGS. 5 to 8, the pressure regulating valve in the second development of the invention acts as 3/2 directional valve with blockage of the energized pressure medium in the pressure medium supply line 2 with great working strokes. The operation here corresponds to that of a hydraulic half bridge with an additional, firmly adjusted, front-mounted, intake diaphragm 3. The pressure medium supply line 2 preferably discharges, via several radially disposed intake holes, in the pressure chamber 7. In a conventional manner, the pressure regulating valve, the housing of which is designated with 1, has an electromagnet (not shown) which moves an armature 13 in direction of the axis A against the action of a spring. The armature 13 positions the control shift valve 12 via an armature rod 10. The control shift valve 12, which joins up with the sealing surface 6 of the armature rod 10, consists of two webs 108 and one sleeve 105. Armature 10 and control shift valve 12 are designed in one piece. The connecting piece is made as rotary part from armature rod 10 and control shift valve 12. On the front surface 6 of the armature rod 10, i.e. on the passage of the operating units armature rod 10 and control shift valve 12, the diameter of said rotary part diminishes on the side of the control shift valve 12. The control shift valve 12 is turned out as hollow cylinder. In the zone of the connecting piece between armature rod 10 and sleeve 105, the hollow cylinder is milled across the axis of rotation to an extent such that only two axially extending webs 108 remain from it. The diameter of said hollow cylinder from which the sleeve 105 and web 108 are worked out is adapted to the diameter of the pressure regulating chamber 7 in a manner such that the sleeve 105 can slide accurately fitting. In one of its end positions, the sleeve 105 at the same time completely seals the intake holes of the pressure medium supply line 2 in the regulating pressure chamber 7. In the other end position, the sealing surface 6 acting as leading edge 11 of the exit abuts axially on the wall surface 4 of the valve housing 1. The intake holes of the pressure medium supply line 2 are simultaneously released so that the pressurized pressure medium fully energizes with pressure the pressure regulating chamber 7 and thus the consumer. In both positions of the connection comprised of armature 3, armature rod 10 and control shift valve 12, the pressure medium flow—similarly to the first development of the invention—is interrupted by locking, on one hand, the intake to the pressure regulating chamber 7 and, on the other, the exist to the pressure medium sump. Therebetween the volume flow Q reaches a maximum when the pressure p of the pressure medium flowing in the pressure regulating chamber 7 increases, as results from FIG. 9.

The complete shut off of the intake holes of the pressure medium supply line 2 by the sleeve 105 produces, therefore, as in the first development of the invention, a minimizing of the pressure medium leakage wherein, contrary to the first development of the invention, the radial pressure medium supply lines exert no back-up pressure conditioned axial force upon the sleeve 105. Thereby the displacement forces to move the sleeve 105 are slight. In the axial position of the control shift valve 12 in which the leading edge 9 of the sleeve 105 precisely covers in part the intake, the armature 13 connected with the control shift valve 12 is, in its position relative to the electromagnet, still in an unfavorable position of weak magnetic forces. However, the weak displacement forces of the sleeve 105 conditioned by the geometry of the intake can, without effort, be applied by the magnet. The sealing surface 6 of the armature rod 10 which produces the internal pressure return from the pressure regulating chamber 7 to the armature active surface makes possible an uncomplicated regulation operation. By adequate selection of material of the sleeve and of the valve housing, a low-friction bearing is directly obtained on the hydraulic side for the seat valve 4, 6. The connecting piece consisting of armature rod 10 and control shift valve 12 is supported in the pressure regulating chamber 7, on one hand, by a bearing point directly in front of the armature 13 and, on the other, by the sleeve 105 of the control shift valve 12. The fit dimension of the bearing on the armature side is dimensional so as to prevent an entrance of iron dust particles. The same as in the conventional seat valve constructed in series which was described in DE-C 44 26 152, the armature in this second development of the invention is pressureless. The problem arising in conventional 2/2 seat valves, that said pressureless armature chamber is flushed by the entrance of the leakage pressure medium and iron dust particles deposit as dirt, is reduced in the pressure regulating valve, according to the invention, in the second, the same as in the first development of the invention, by blocking the intake in the pressure regulating chamber in the end position "minimal working pressure". Chips having a diameter of the size classification of up to 200 μm such as they appear, e.g. as green assembly dirt, can be clamped between the leading edge 9, the sleeve 105 and the intake hole. In this working stroke the intake cannot be completely blocked. A small through flow to the pressure medium sump remains. A jamming of the control shift valve 12 due to this entrance of chips is not possible in this position of the control shift valve 12 because of the weak displacement forces. Similarly to the first development of the invention, the weak clamping forces, resulting from the weak displacement forces, do not lead to damage of the leading edge by the introduction of chips. In the next working stroke, if the intake hole is again opened, the chip is again released.

Figure 13A:
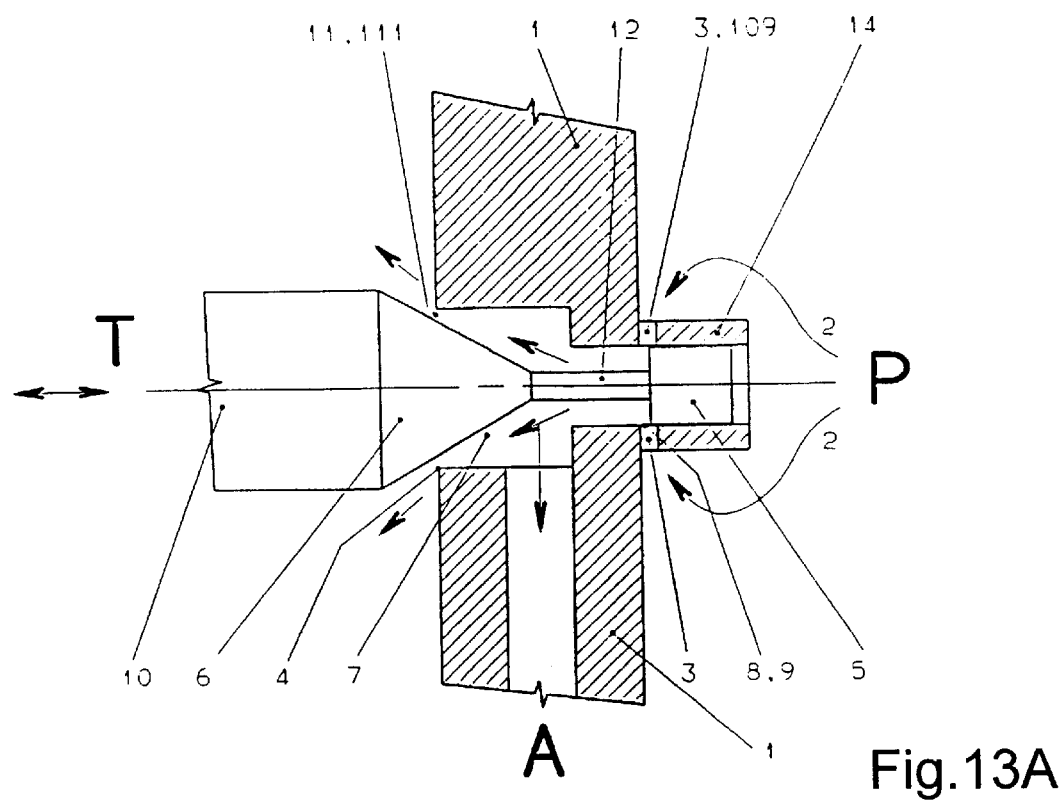
Figure 13B:
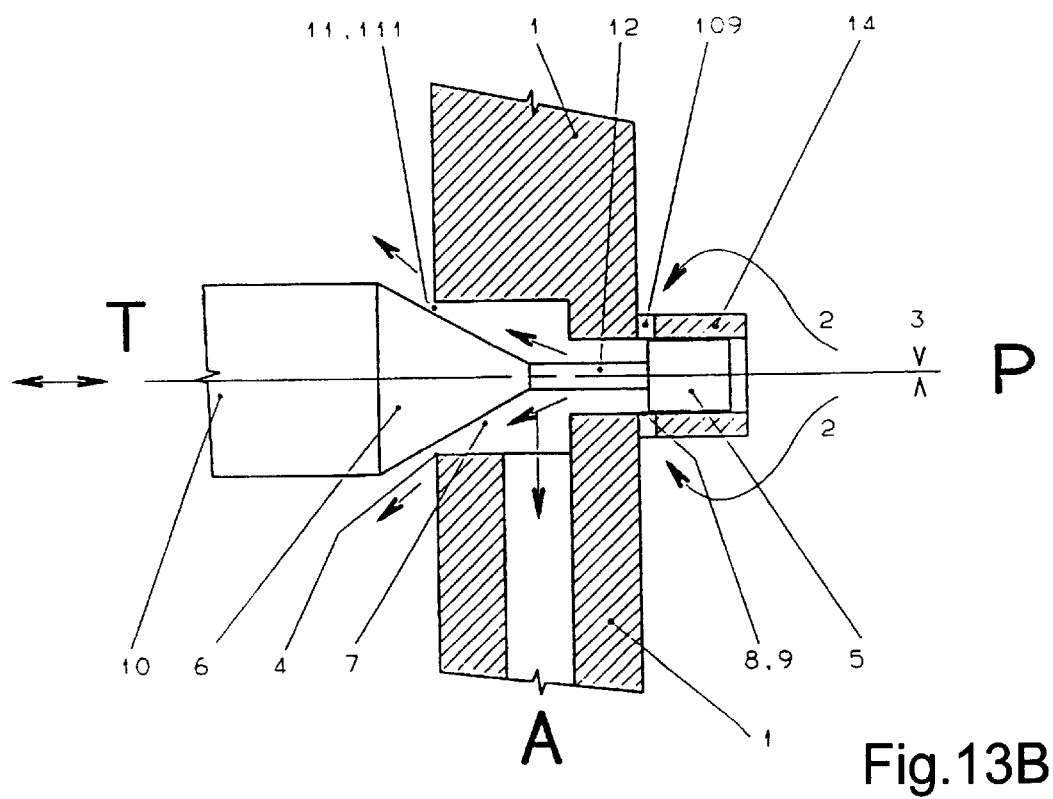
Figure 14A:
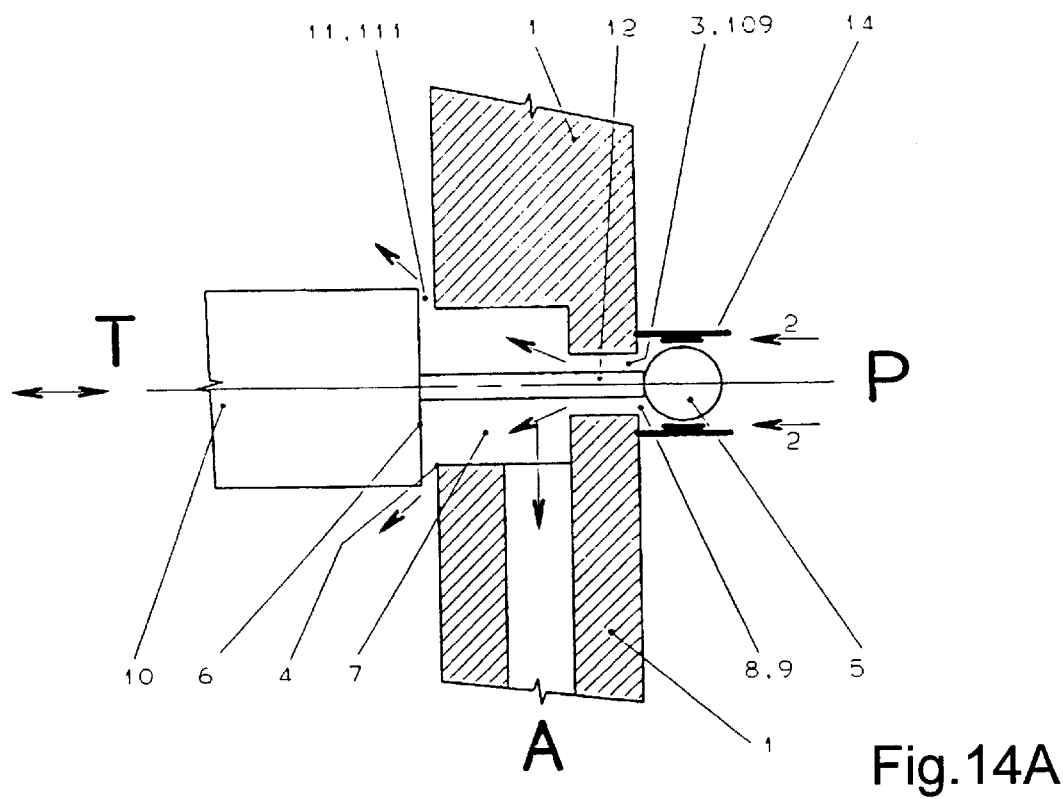
Figure 14B:
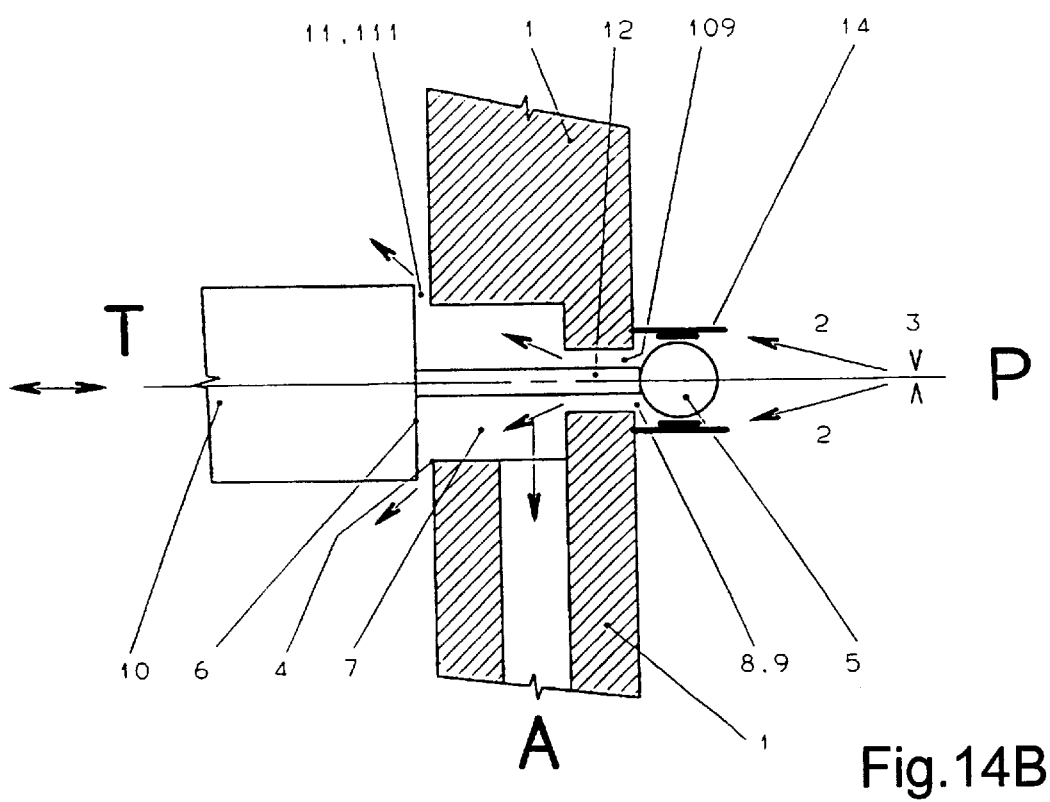
Figure 15A:
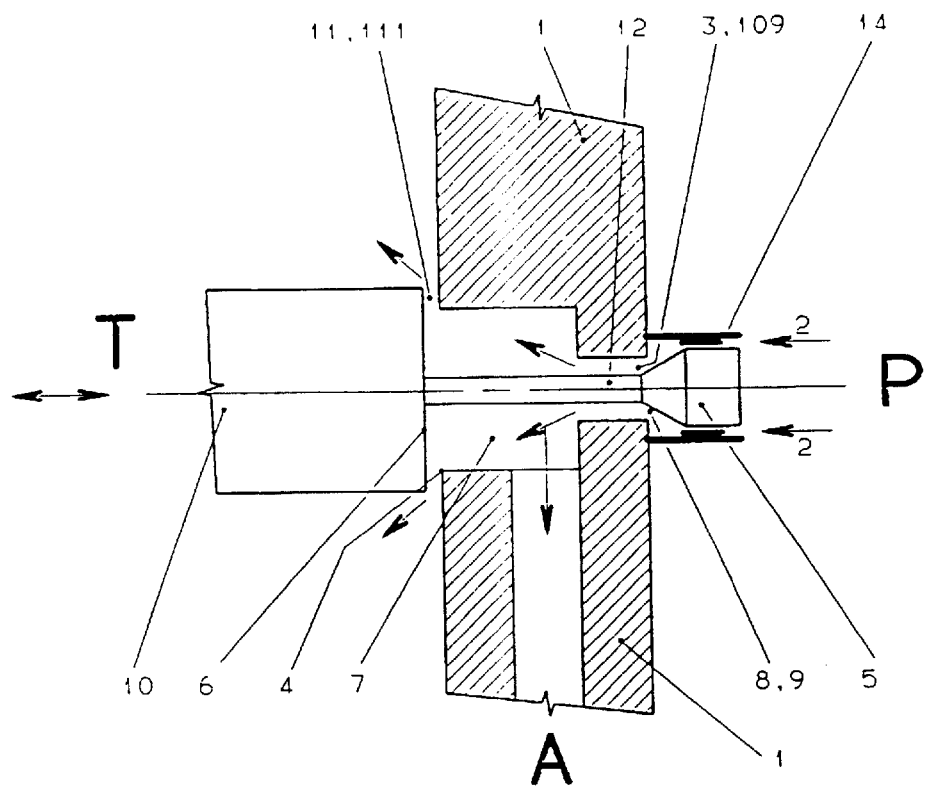
Figure 15B:
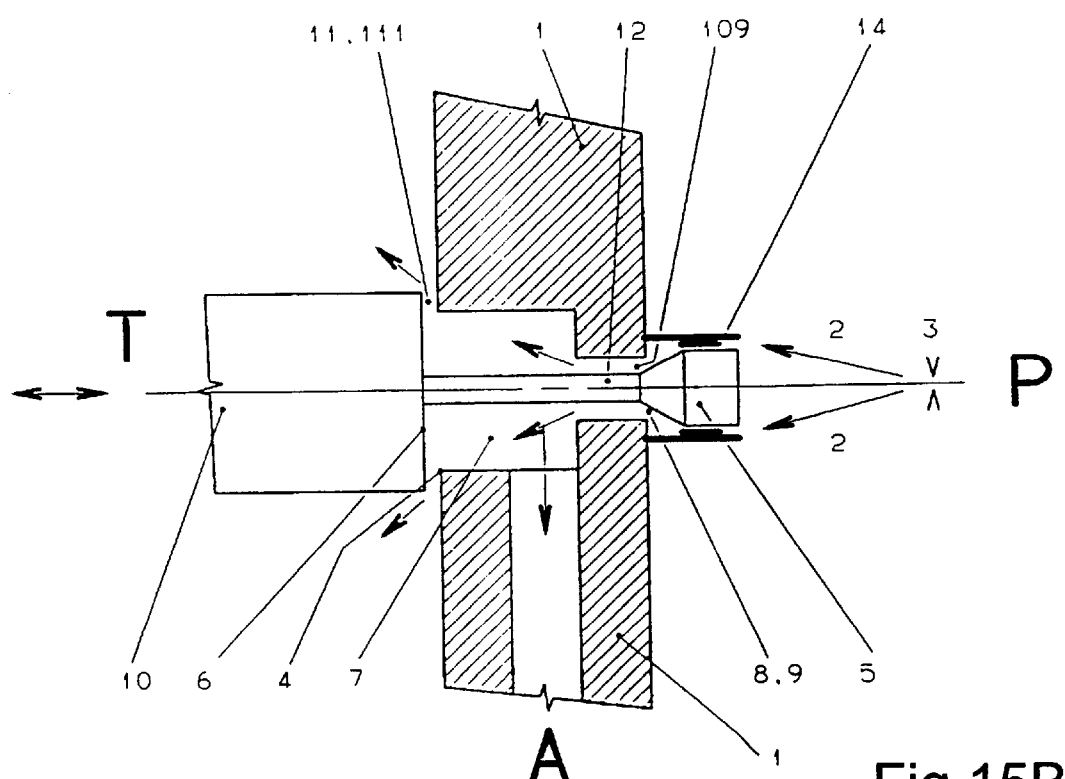
Figure 16A:
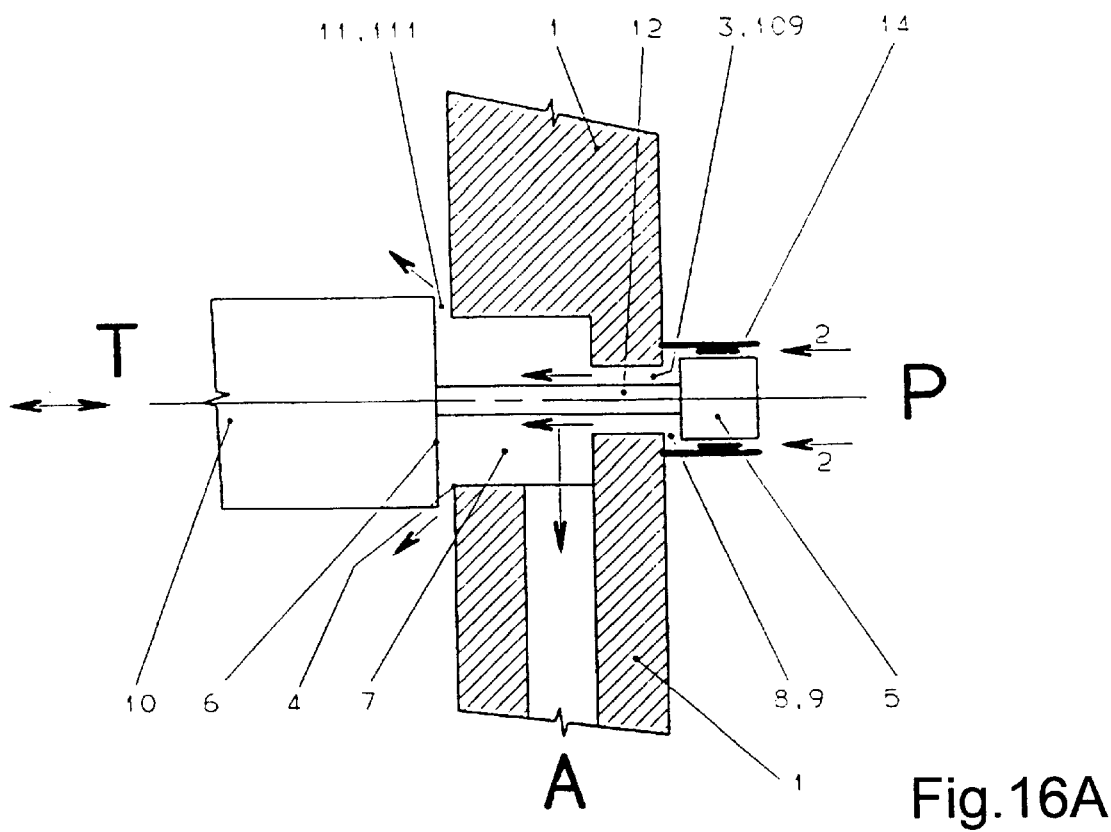
Figure 16B:
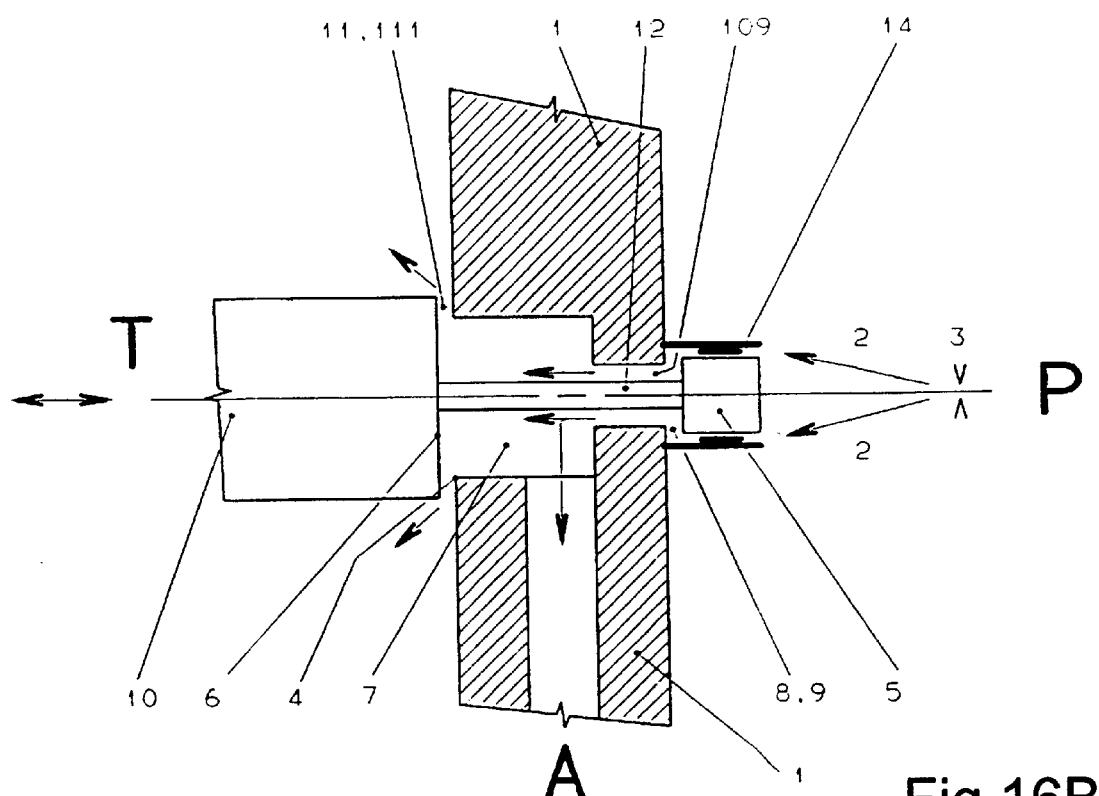
Figure 17A:
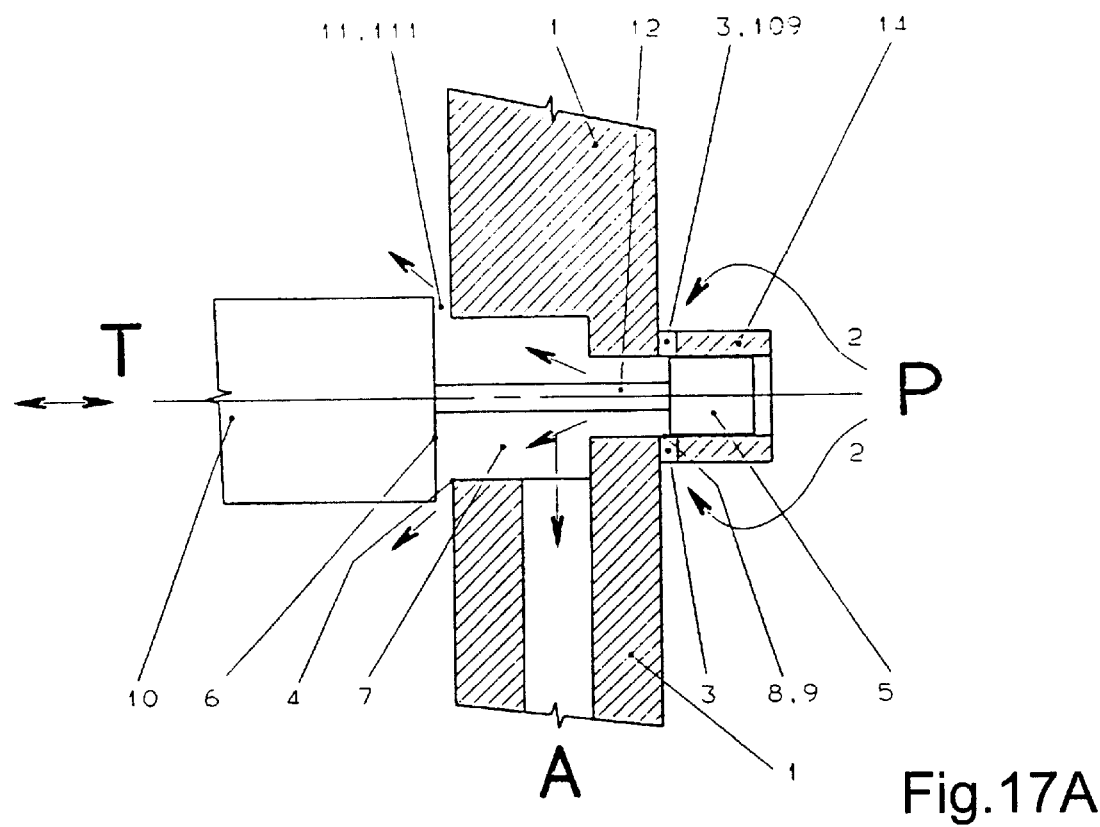
Figure 17B:
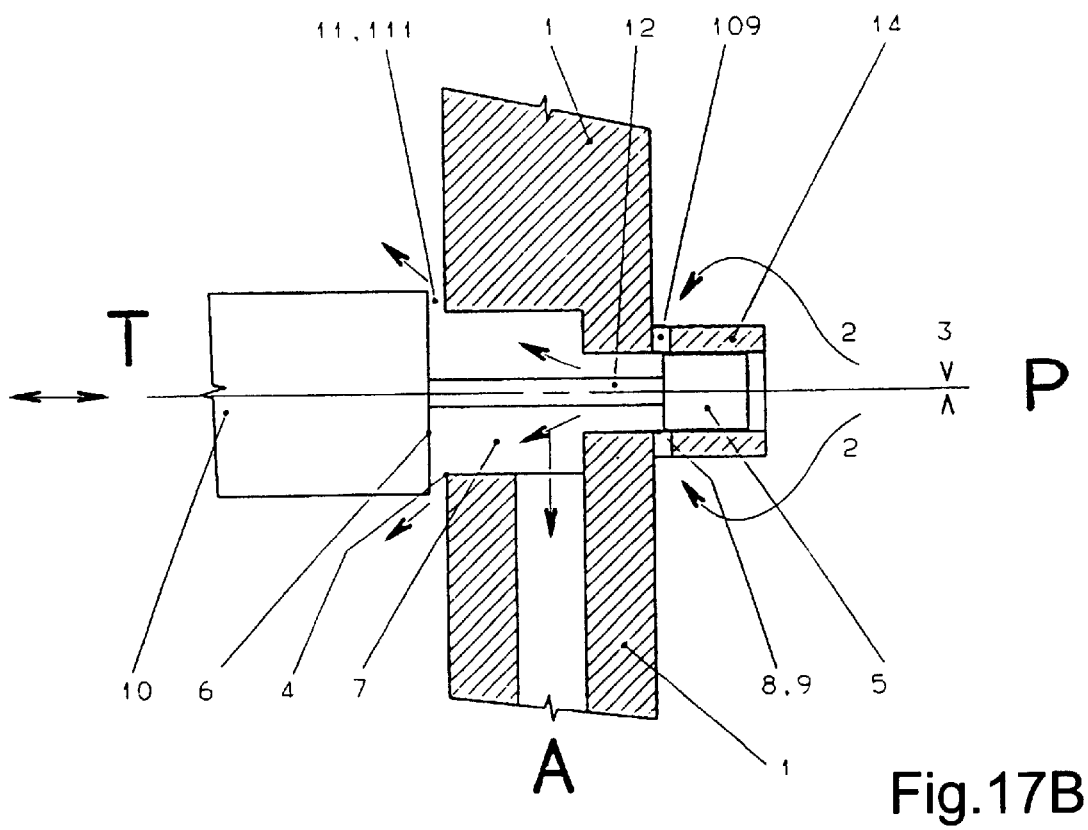
Figure 18A:
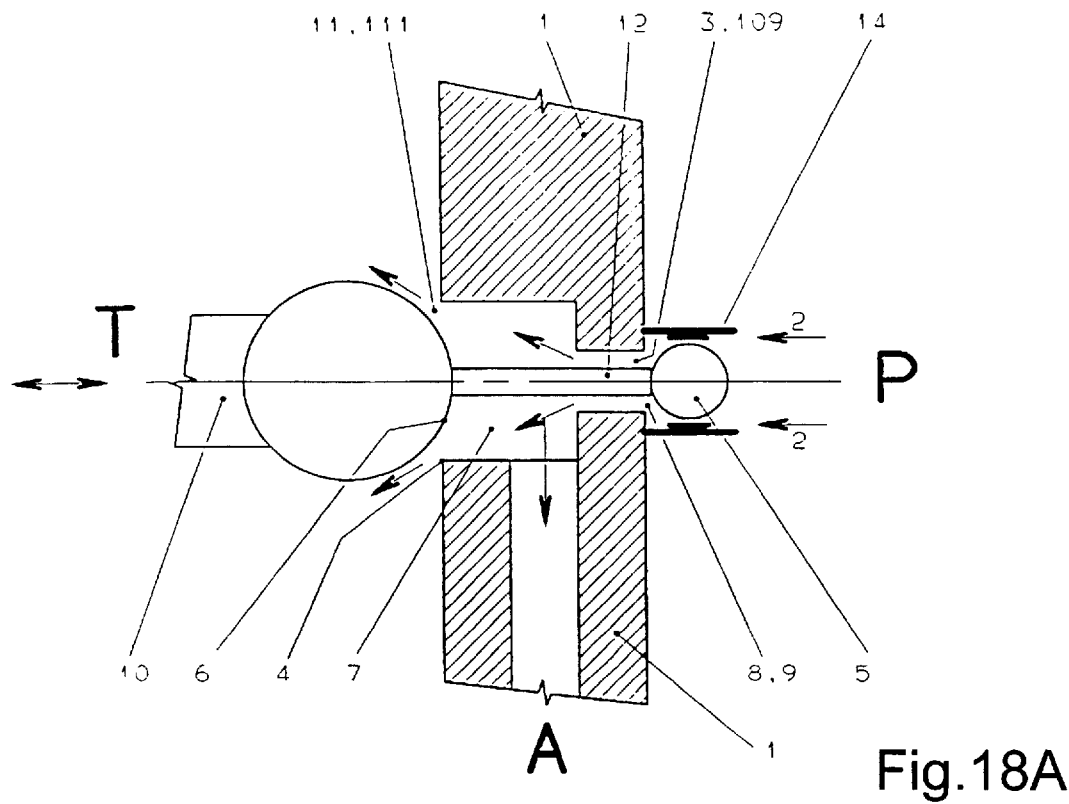
Figure 18B:
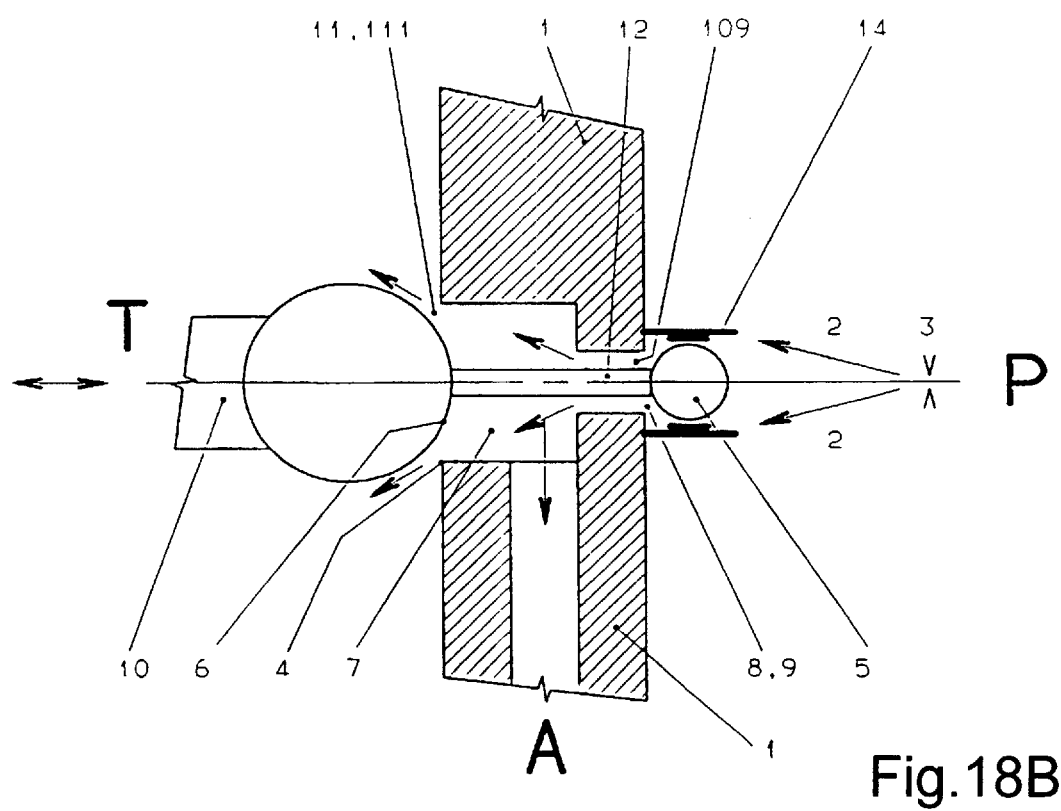
Figure 19A:
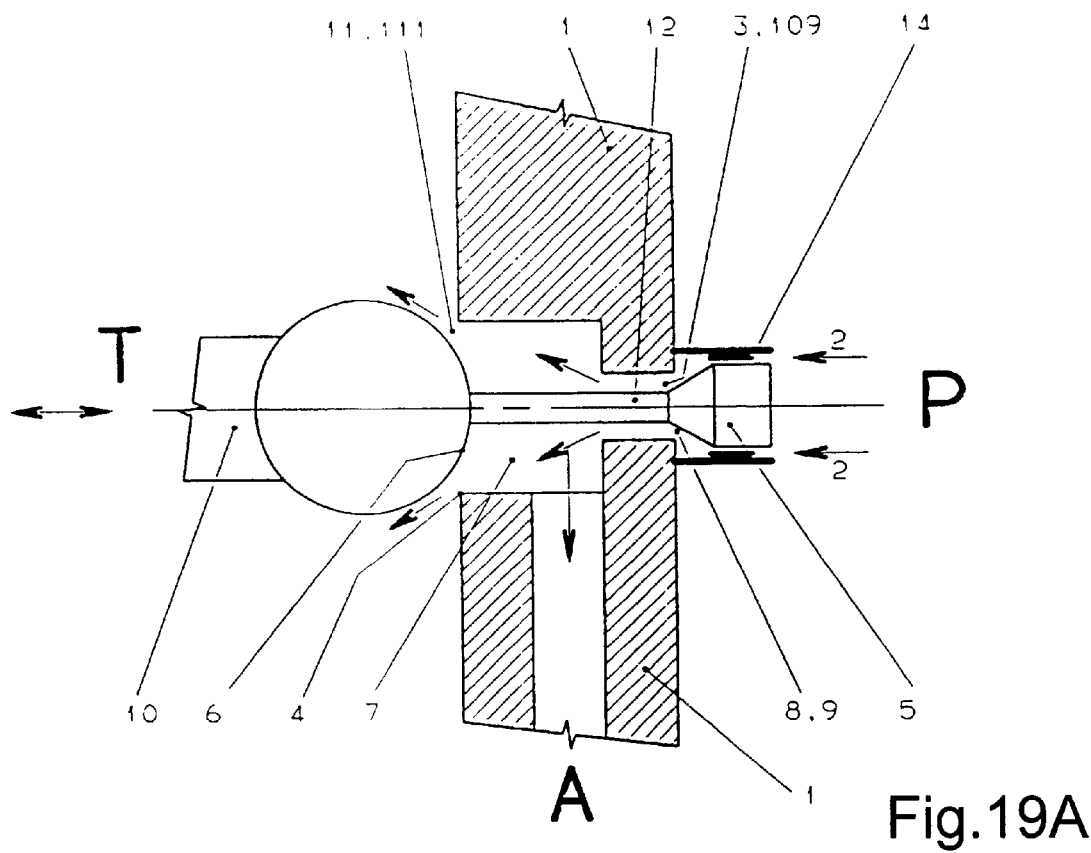
Figure 19B:
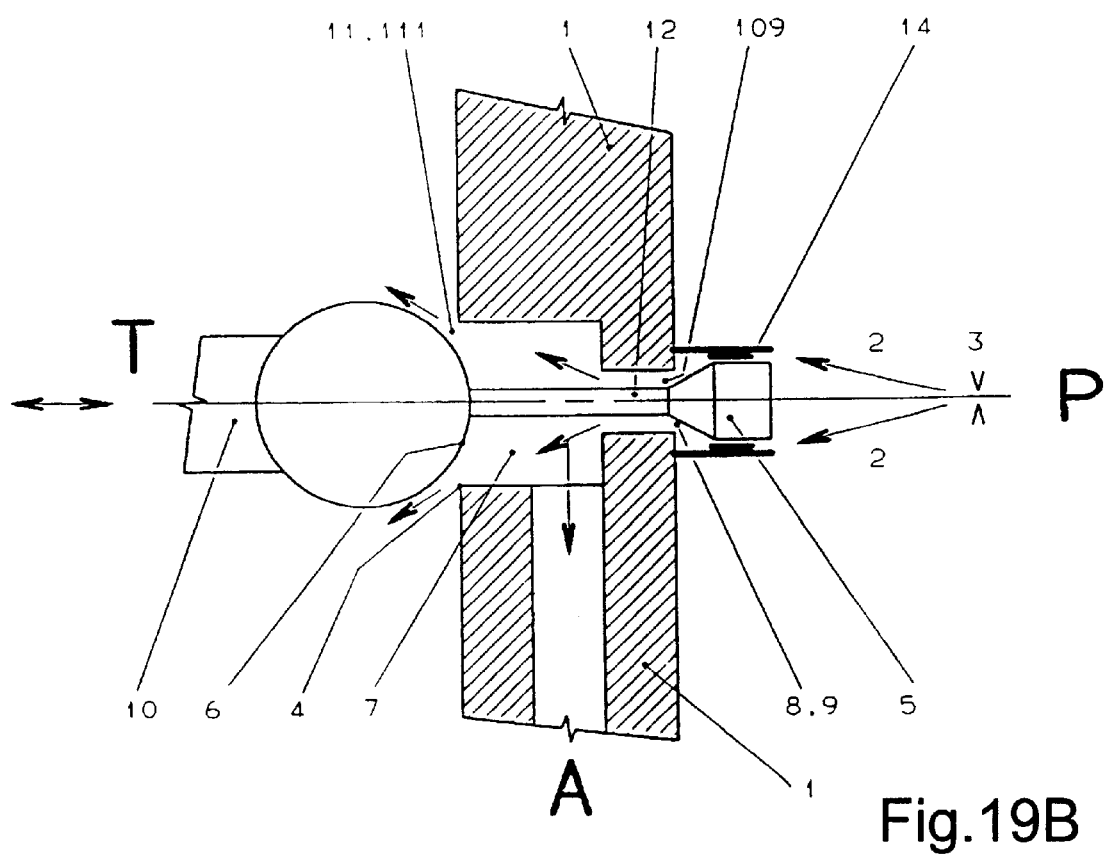
Figure 20A:
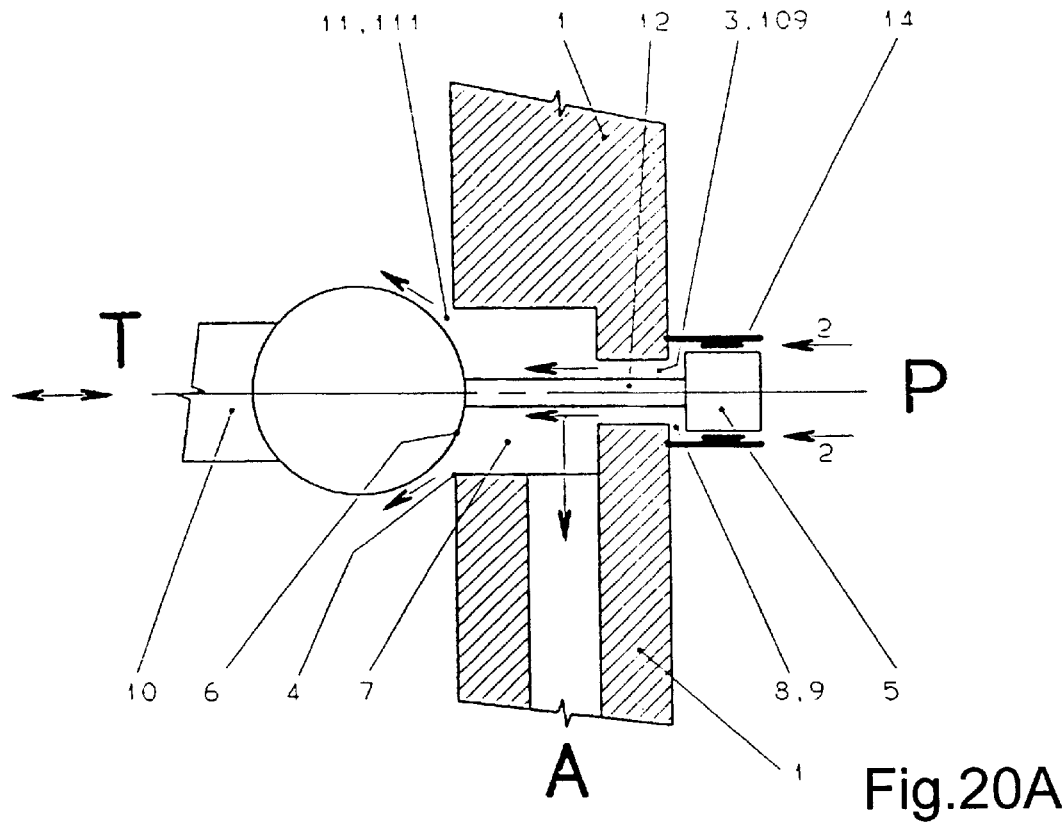
Figure 20B:
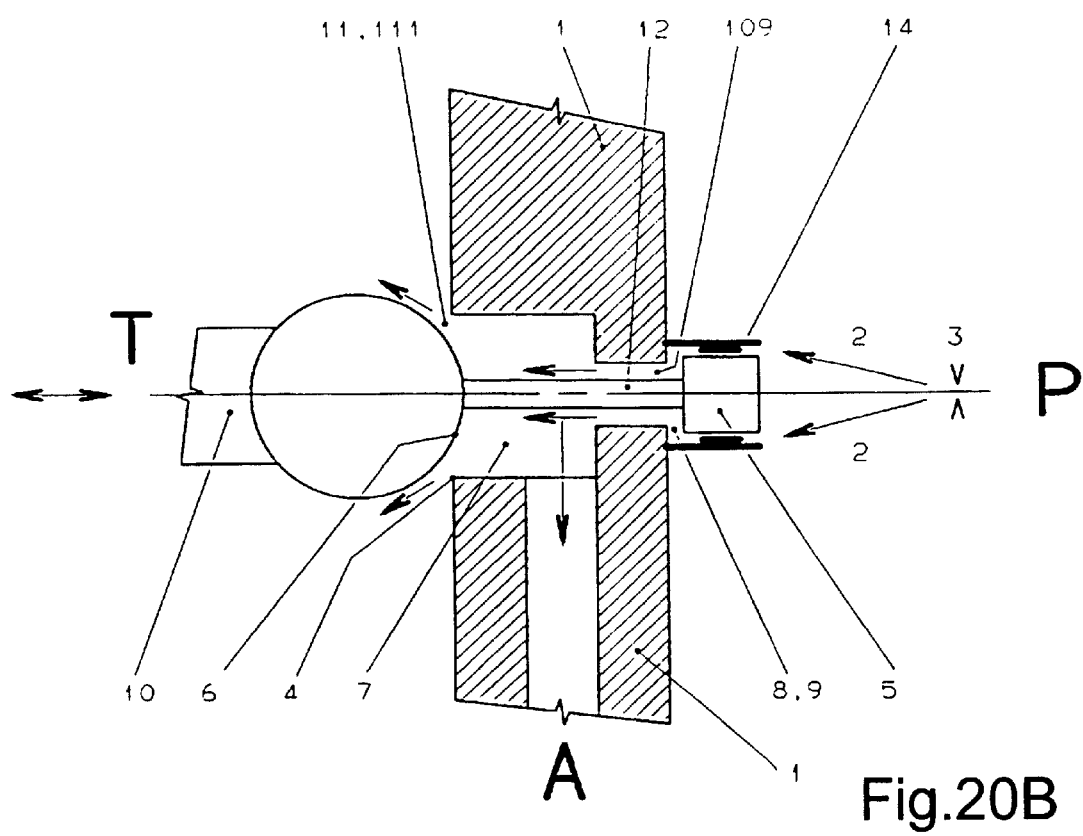
Figure 21A:
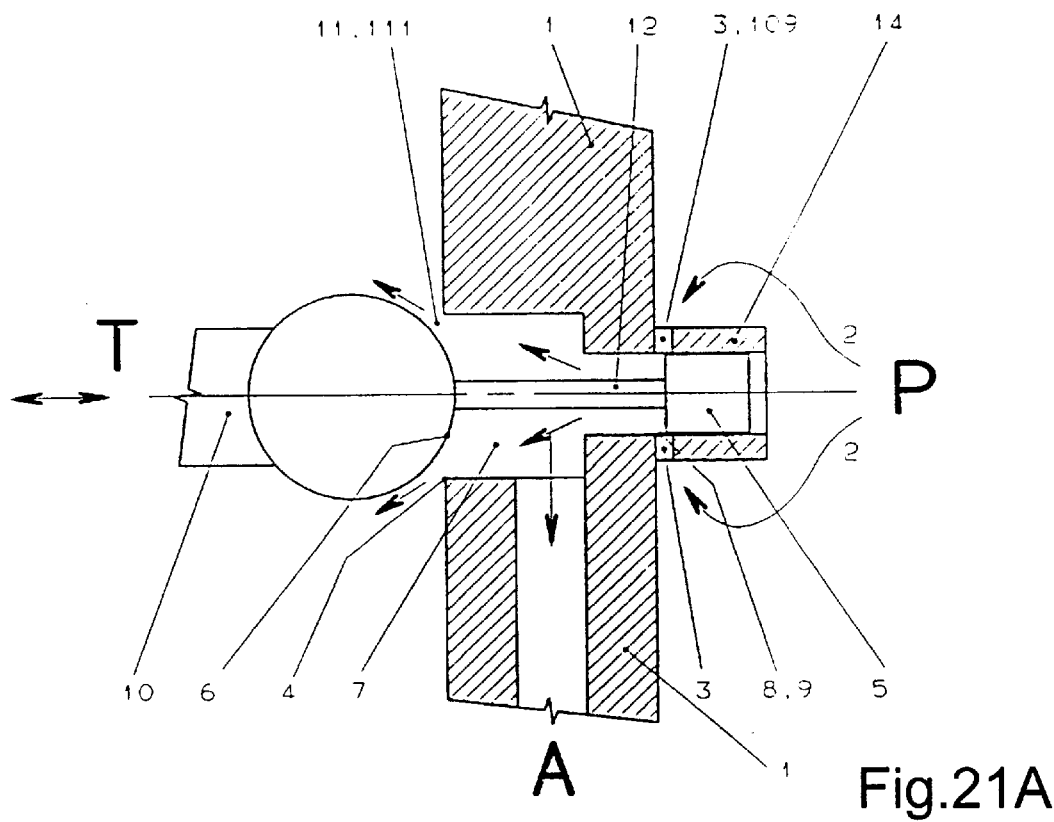
Figure 21B:
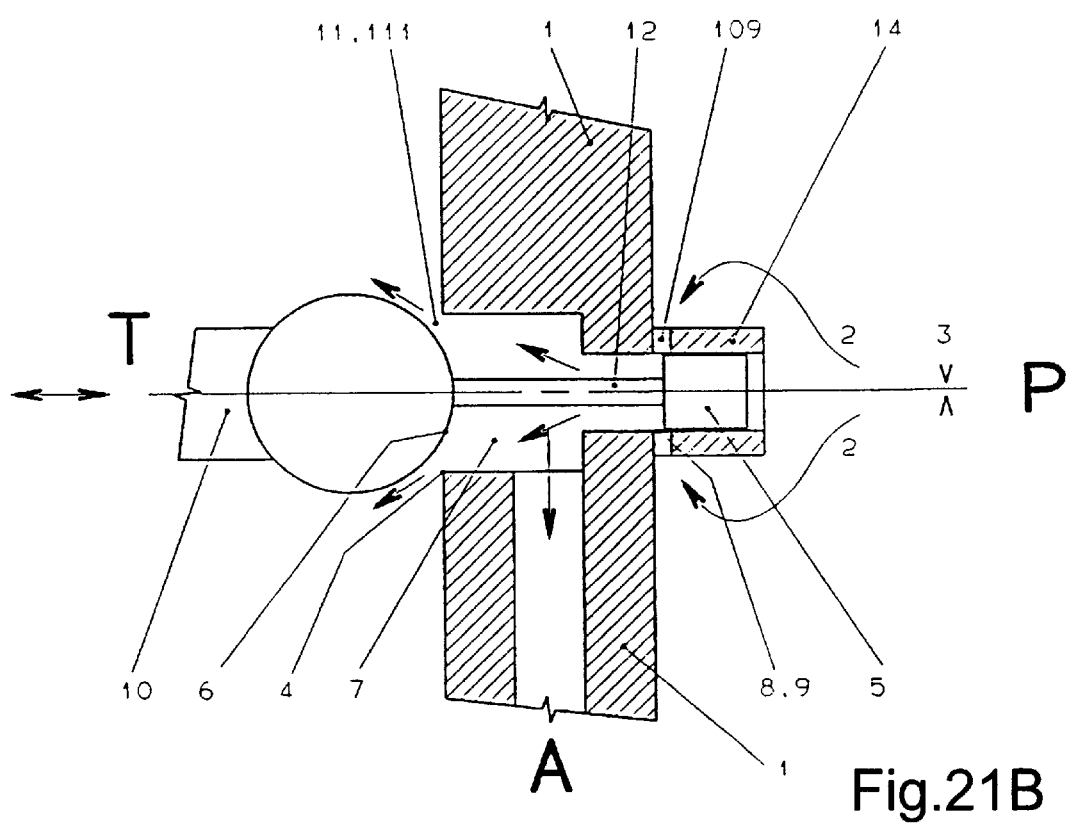
Figure 22A:
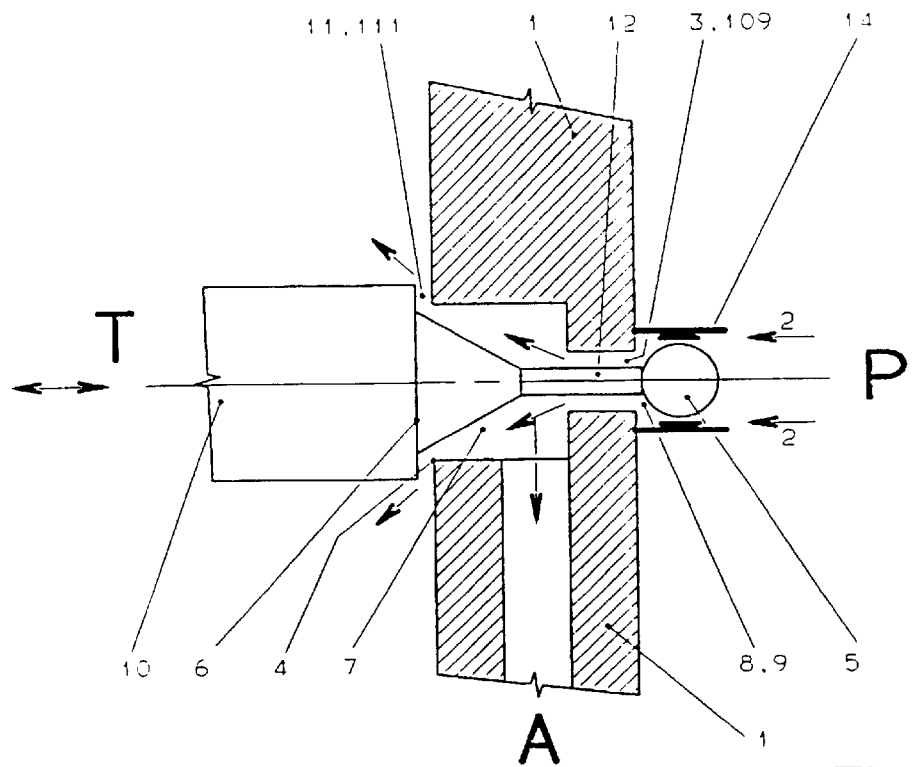
Figure 22B:
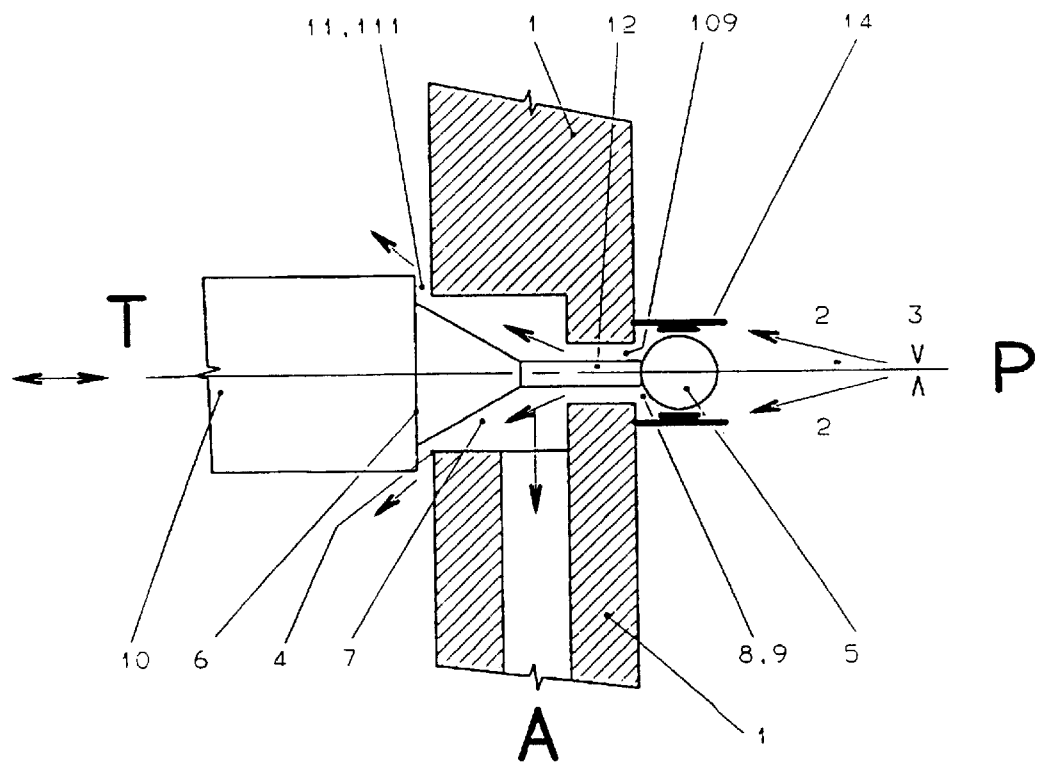
Figure 23A:
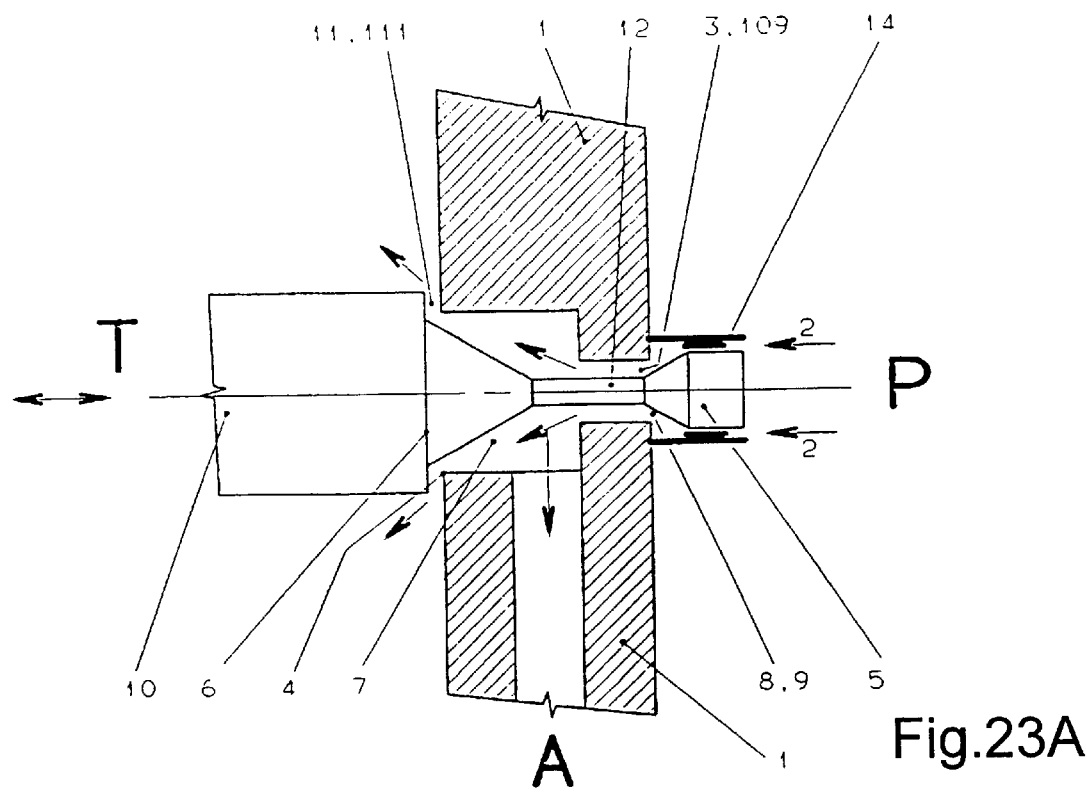
Figure 23B:
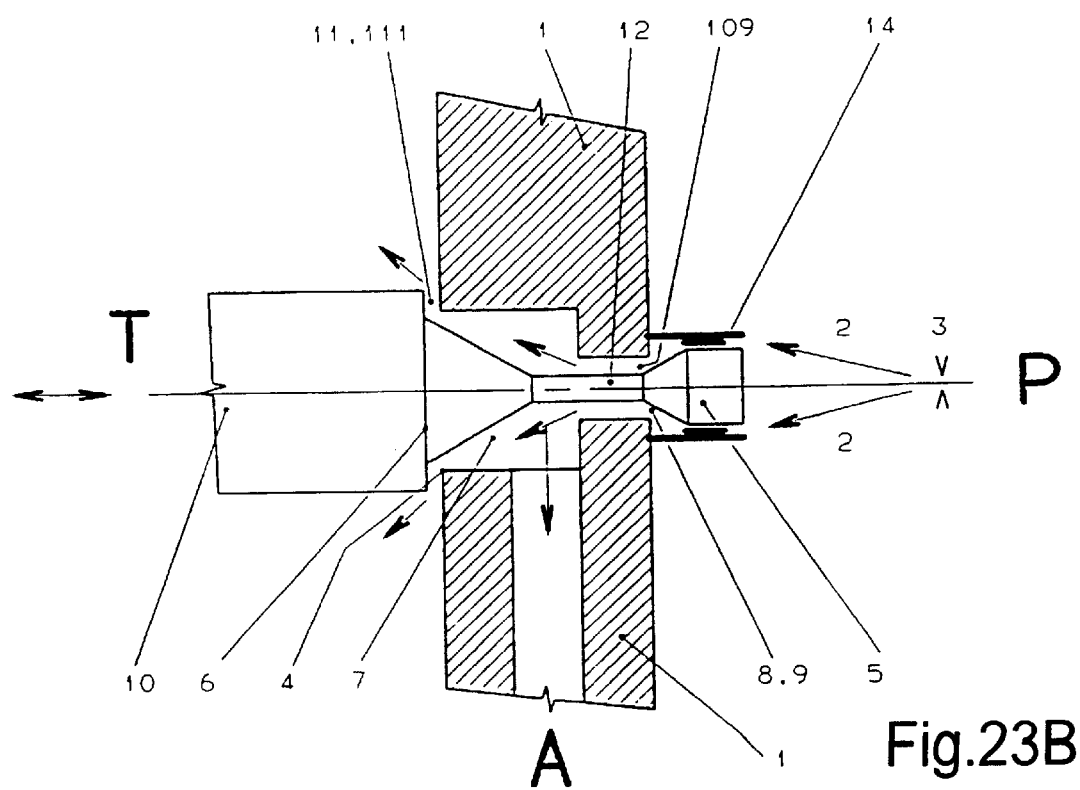
Figure 24A:
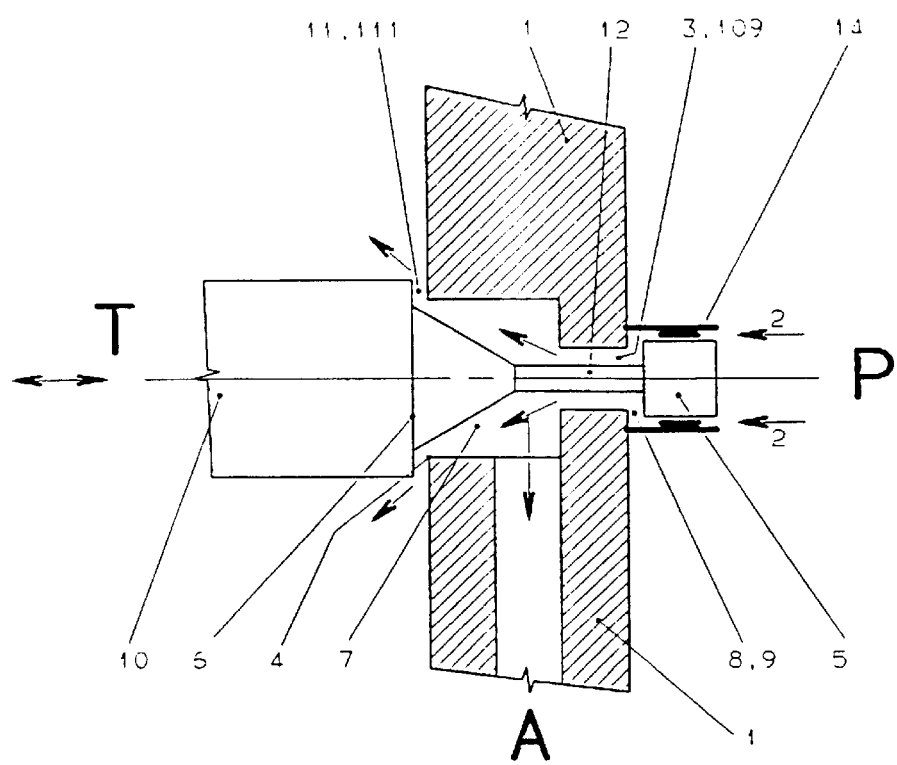
Figure 24B:
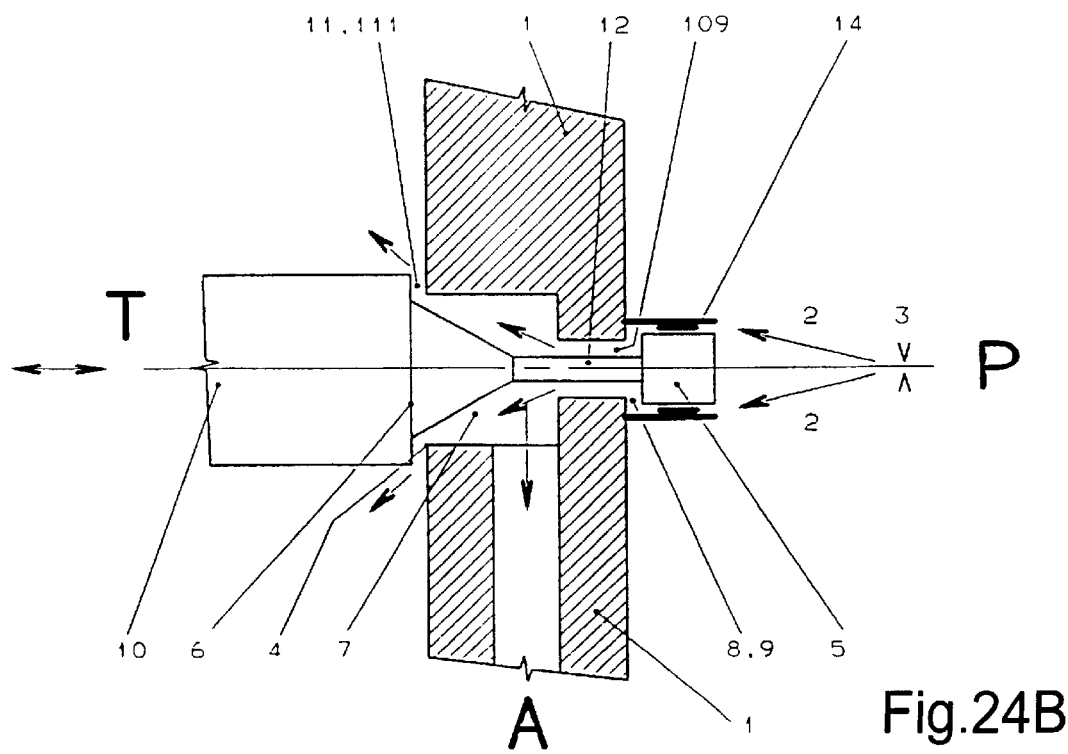
Figure 25A:
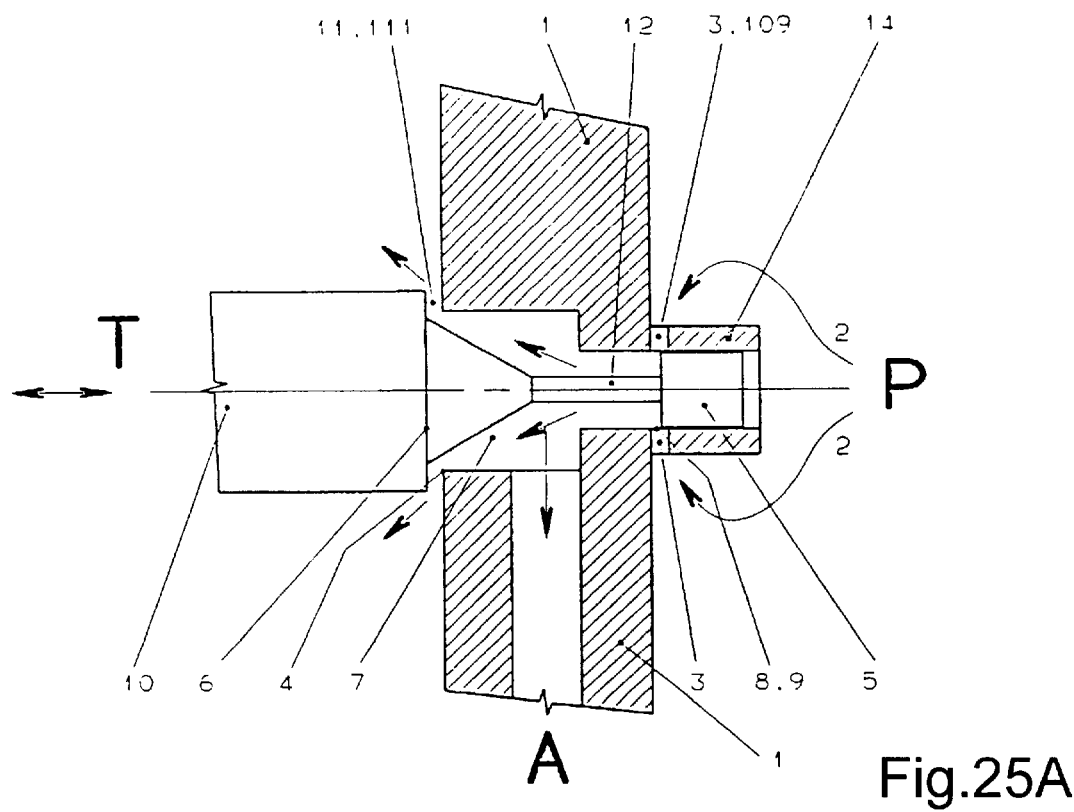
Figure 25B:
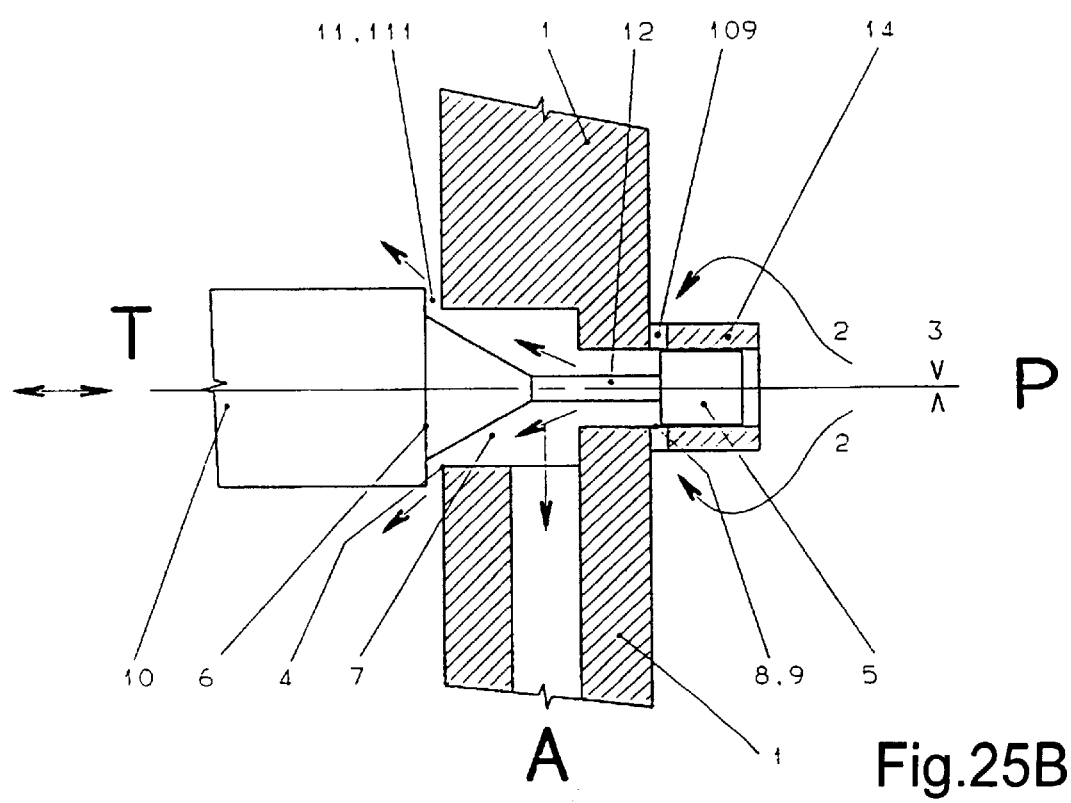

In FIGS. 10A to 13B are shown pressure regulating valves which have, in the outlet diaphragm, a frustoconical sealing element, the sealing surface 6 lying on the cone-shaped surface of the sealing element. The sealing elements 5 of the inlet diaphragm 19, on the other hand, are optionally formed by a cylinder (FIGS. 10A and 10B), a ball (FIGS. 11A and 11B), or a truncated cone (FIGS. 12A and 12B) as seat valve or by a cylinder (FIGS. 13A and 13B) as shift valve. At the same time, the sealing elements 5 are by a case 14 which can also be used to form the inlet diaphragm 109 (FIGS. 13A and 13B).

In FIGS. 14A to 17B are shown valve designs, which provide for the outlet diaphragm 111, a cylindrical sealing element; the sealing elements of the outlet diaphragm 111 are each designed as ball in FIGS. 18A to 21B, while in FIGS. 22A to 25B the sealing element in the outlet 111 has a flat seat seal with a front-mounted, truncated cone. The variants of the sealing elements 5 in the area of the inlet diaphragm 109 correspond to the designs already explained for FIGS. 10A to 13B.

What is claimed is:

1. A pressure regulating valve comprising:
    a valve housing (1) defining a pressure regulating chamber (7) therein, the pressure regulating chamber (7) having an inlet (3) for connection to a supply pressure line (P), the pressure regulating chamber (7) having a first outlet for connection to a working pressure line (A), and the pressure regulating chamber having a second outlet (11) for connection to an ambient pressure line (T);
    an inlet valve (5) for controlling flow of a pressurized fluid from the pressure line (P) through the inlet (3) into the pressure regulating chamber (7) and an outlet valve for controlling flow of the pressurized fluid from the pressure regulating chamber (7) through the second outlet (11); and
    an electromagnetically controlled armature (13) coupled to an armature rod (10) with a remote second end of the armature rod (10) supporting a control shift valve member (12), and the electromagnetically controlled armature (13) and the armature rod (10) being simultaneously movable along a longitudinal axis (A) of the pressure regulating valve, via an electromagnet, relative to the pressure regulating chamber to facilitate opening and closing of the inlet valve (5) via the valve member (12);
    wherein a surface circumscribing and adjacent the second outlet (11) is planar and a leading portion of a surface supported by the armature rod (10), and spaced from the electromagnetically controlled armature (13), forms a movable sealing surface which is planar, the movable planar sealing surface supported by the armature rod (10) and the planar surface circumscribing the second outlet (11) both lie in planes which extend normal to the longitudinal axis (A) of the pressure regulating valve, and when the movable planar sealing surface engages with the planar surface circumscribing the second outlet (11), the second valve is closed to prevent flow of the pressurized fluid therethrough, and when the movable planar sealing surface is spaced from the planar surface circumscribing the second outlet (11), the second valve is open and permits flow of the pressurized fluid therethrough.

2. The pressure regulating valve according to claim 1, wherein the inlet valve comprises a movable sealing element and a cooperating sealing element seat, and a dimension of the sealing element is smaller than a dimension of the planar surface (6) circumscribing the second outlet (11).

3. The pressure regulating valve according to claim 2, wherein a cage (14) at least partially surrounds the movable sealing element of the inlet valve.

4. The pressure regulating valve according to claim 2, wherein the armature rod (10), the control shift valve (12) and the movable sealing element are formed as a unitary component.

5. The pressure regulating valve according to claim 1 wherein, when the second valve is closed, the flow of the pressurized fluid from the pressure regulating chamber to an ambient pressure line (T) is prevented; and, when the second valve is opened, the flow of the pressurized fluid from the pressure regulating chamber to the ambient pressure line (T) is permitted.

6. The pressure regulating valve according to claim 1, wherein the movable planar sealing surface (6) supported by the armature rod (10) is located adjacent the shift valve member (12).

7. The pressure regulating valve according to claim 1, wherein the inlet valve comprises a movable sealing element and a sealing element seat, and the movable sealing element of the inlet valve is one of a ball-, and a truncated cone.

8. The pressure regulating valve according to claim 1, wherein a cage (14) at least partially surrounds a movable sealing element of the inlet valve.

9. The pressure regulating valve according to claim 1, wherein the armature rod (10) and the control shift valve (12) are formed as separate components.

10. The pressure regulating valve according to claim 1, wherein, during operation of the pressure regulating valve, as an inlet cross section of the inlet valve increases, an outlet cross section of the outlet valve correspondingly decreases; and
    as the inlet cross section of the inlet valve decreases, the outlet cross section of the outlet valve correspondingly increases.

11. The pressure regulating valve according to claim 1, wherein the pressure regulating valve is constructed as a system and the inlet valve and the outlet valve (109, 111) are subject to one of a mechanical action and a hydraulic action.

12. The pressure regulating valve according to claim 1, wherein the armature rod (10) and the control shift valve (12) are formed as a unitary component.

13. The pressure regulating valve according to claim 1, wherein the movable planar sealing surface of the outlet valve faces the second outlet.

14. The pressure regulating valve according to claim 1, wherein the second outlet for connection to an ambient pressure line (T) communicates only with the movable planar sealing surface such that the pressurized fluid flowing from the pressure regulating chamber through the second outlet is prevented from communicating with the electromagnetically controlled armature (13) by the valve housing (1).

15. The pressure regulating valve according to claim 1, wherein the control shift valve (12) is a double-sided cone which tapers in a center region thereof and the double-sided cone with the tapered center region regulates the flow of pressurized fluid through the inlet valve and the outlet valve.

16. The pressure regulating valve according to claim 1, wherein a portion between a front surface of the armature rod (10) and the control shift valve (12) has a frustoconical shape.

17. The pressure regulating valve according to claim 1, wherein the pressure regulating valve is incorporated in an automatic transmission for regulating hydraulic pressure of the automatic transmission to actuate transmission shift elements.

18. A pressure regulating valve comprising:

a valve housing (1) defining a pressure regulating chamber (7) therein, the pressure regulating chamber (7) having an inlet (3) for connection to a supply pressure line (P), the pressure regulating chamber (7) having a first outlet for connection to a working pressure line (A), and the pressure regulating chamber having a second outlet (11) for connection to an ambient pressure line (T);

an inlet valve (5) for controlling flow of a pressurized fluid from the pressure line (P) through the inlet (3) into the pressure regulating chamber (7) and an outlet valve (11) for controlling flow of the pressurized fluid from the pressure regulating chamber (7) through the second outlet (11); and an actuatable armature (13) including an armature rod (10) with a remote end of the armature rod (10) supporting a control shift valve member (12), and the actuatable armature (13) and the armature rod (10) being simultaneously movable along a longitudinal axis (A) of the pressure regulating valve, via an actuator of the actuatable armature (13), relative to the pressure regulating chamber to facilitate opening and closing of the inlet valve via the valve member (12);

wherein a surface circumscribing and adjacent the second outlet (11) is planar and a leading portion of a surface supported by the armature rod (10), and spaced from the armature (13), forms a movable sealing surface which is planar, the movable planar sealing surface supported by the armature rod (10) and the planar surface circumscribing the second outlet (11) both lie in planes which extend normal to the longitudinal axis (A) of the pressure regulating valve, and when the movable planar sealing surface engages with the planar surface circumscribing the second outlet (11) the second valve is closed to prevent flow of the pressurized fluid therethrough, and when the movable planar sealing surface is spaced from the planar surface circumscribing the second outlet (11), the second valve is open and permits flow of the pressurized fluid therethrough.

19. A pressure regulating valve comprising:

a valve housing (1) defining a pressure regulating chamber (7) therein, the pressure regulating chamber (7) having an inlet (3) for connection to a supply pressure line (P), the pressure regulating chamber (7) having a first outlet for connection to a working pressure line (A) and the pressure regulating chamber having a second outlet (11) for connection to an ambient pressure line (T);

an inlet valve (5) for controlling flow of a pressurized fluid from the pressure line (P) through the inlet (3) into the pressure regulating chamber (7) and an outlet valve for controlling flow of the pressurized fluid from the pressure regulating chamber (7) through the second outlet (11); and an electromagnetically controlled armature (13) coupled to an armature rod (10) with a remote end of the armature rod (10) supporting a control shift valve member (12), and the electromagnetically controlled armature (13) and the armature rod (10) being simultaneously movable along a longitudinal axis (A) of the pressure regulating valve, via an electromagnet, relative to the pressure regulating chamber to facilitate opening and closing of the inlet valve via the valve member (12);

wherein a surface circumscribing and adjacent the second outlet (11) is planar and a leading portion of a surface supported by the armature rod (10), and spaced from the electromagnetically controlled armature (13), forms a movable sealing surface which is planar, the movable planar sealing surface supported by the armature rod (10) and the planar surface circumscribing the second outlet (11) both lie in planes which extend normal to the longitudinal axis (A) of the pressure regulating valve and, when the movable planar sealing surface engages with the planar surface circumscribing the second outlet (11), the second valve is closed to prevent flow of the pressurized fluid therethrough and when the movable planar sealing surface is spaced from the planar surface circumscribing the second outlet (11), the second valve is open and permits flow of the pressurized fluid therethrough;

the inlet valve comprises a movable sealing element and a cooperating sealing element seat, and a dimension of the sealing element is smaller than a dimension of the planar surface (6) circumscribing the second outlet (11); and the movable planar sealing surface (6) of the leading portion supported by the armature rod (10) is located adjacent the shift valve member (12).

* * * * *